Aug. 29, 1939.  J. C. FERRANTE  2,170,816
SYNCHRONOUS CONVERTER CONTROL SYSTEM
Filed Aug. 13, 1937  3 Sheets-Sheet 1
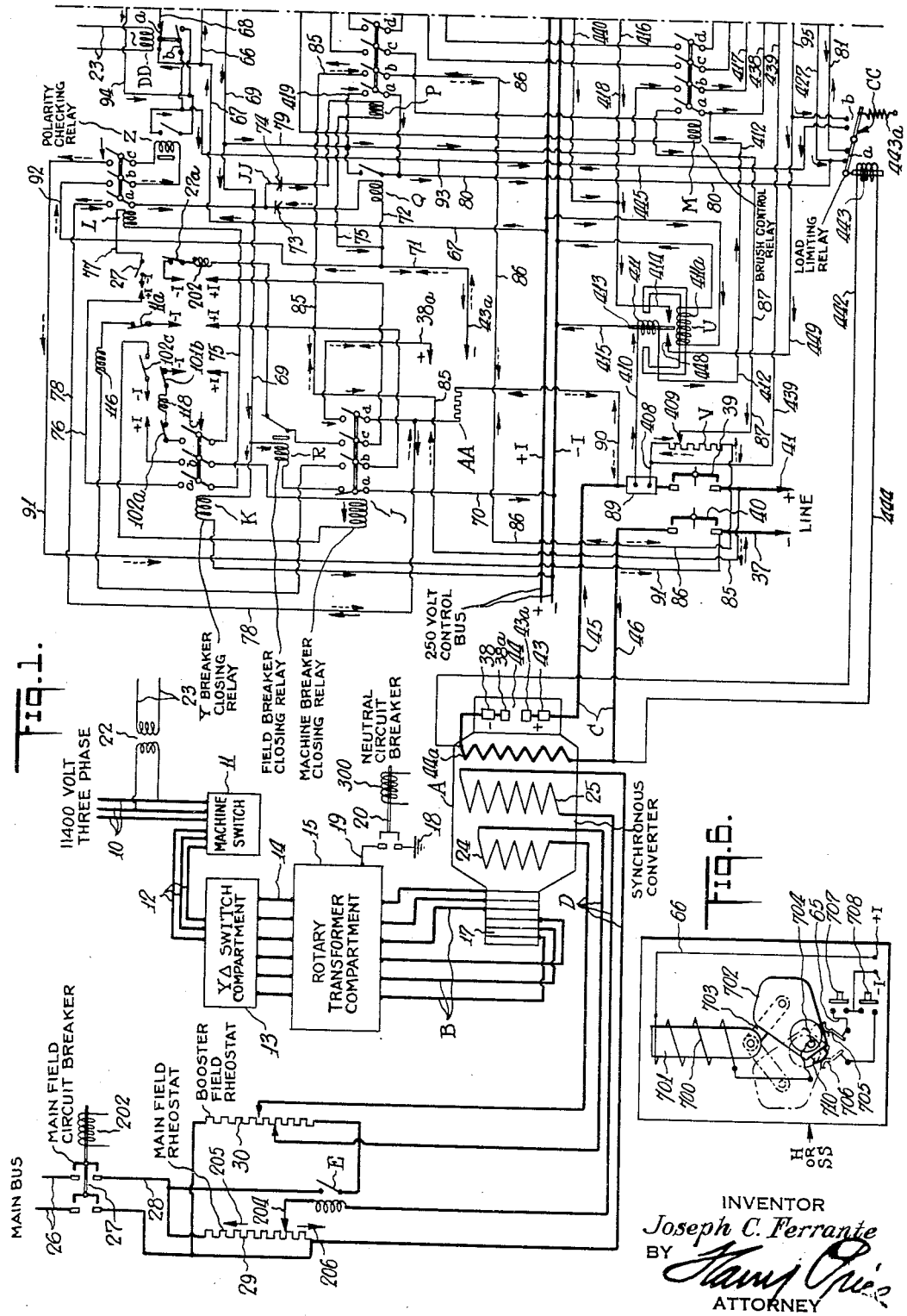
INVENTOR
Joseph C. Ferrante
BY
ATTORNEY Aug. 29, 1939. J. C. FERRANTE 2,170,816
SYNCHRONOUS CONVERTER CONTROL SYSTEM
Filed Aug. 13, 1937 3 Sheets-Sheet 2
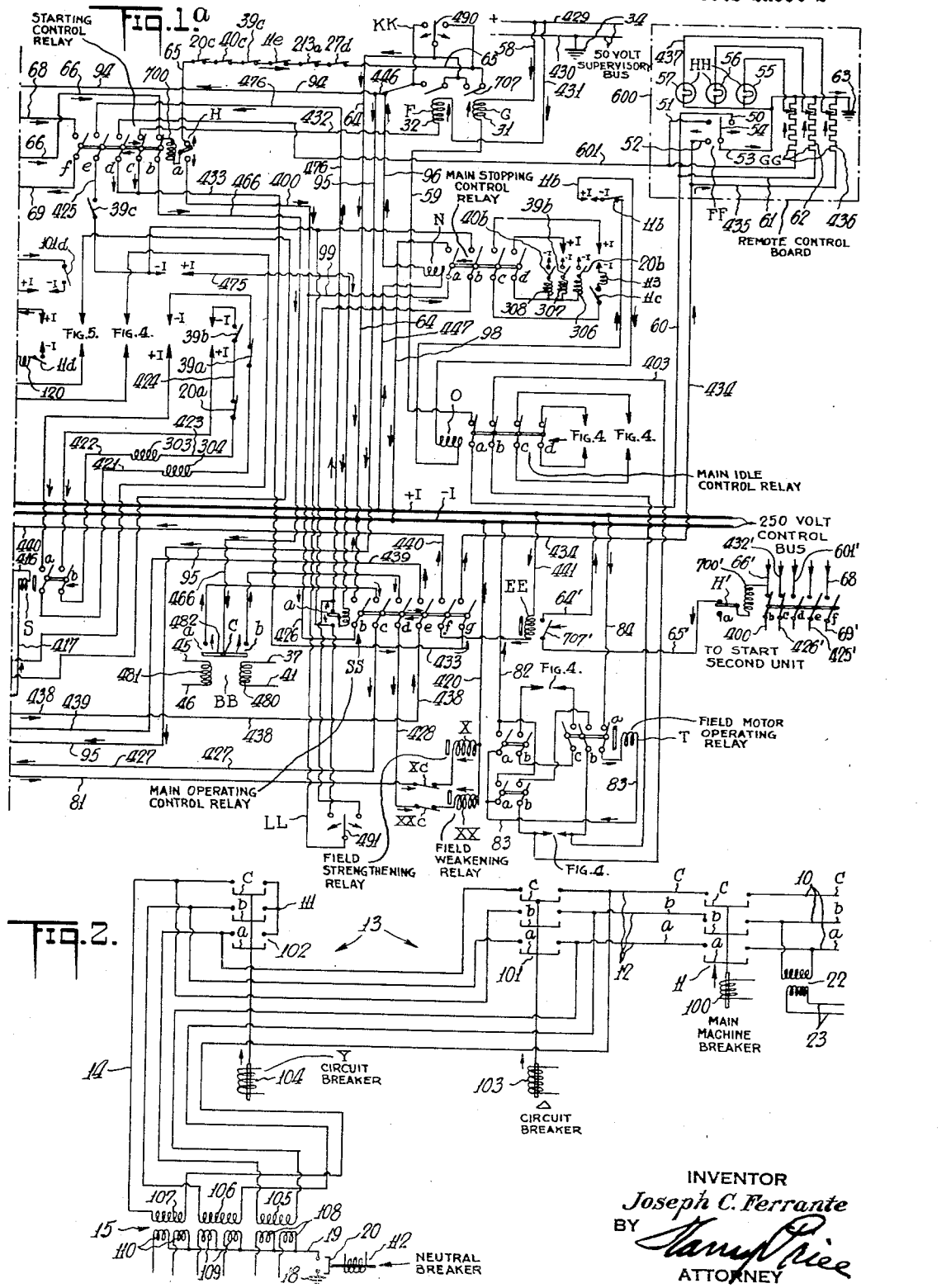
INVENTOR
Joseph C. Ferrante
BY
ATTORNEY Aug. 29, 1939. J. C. FERRANTE 2,170,816
SYNCHRONOUS CONVERTER CONTROL SYSTEM
Filed Aug. 13, 1937 3 Sheets-Sheet 3
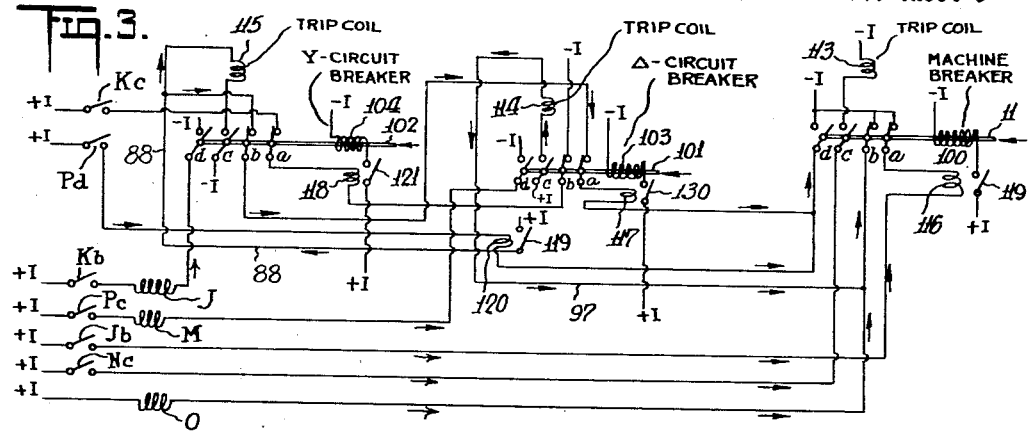
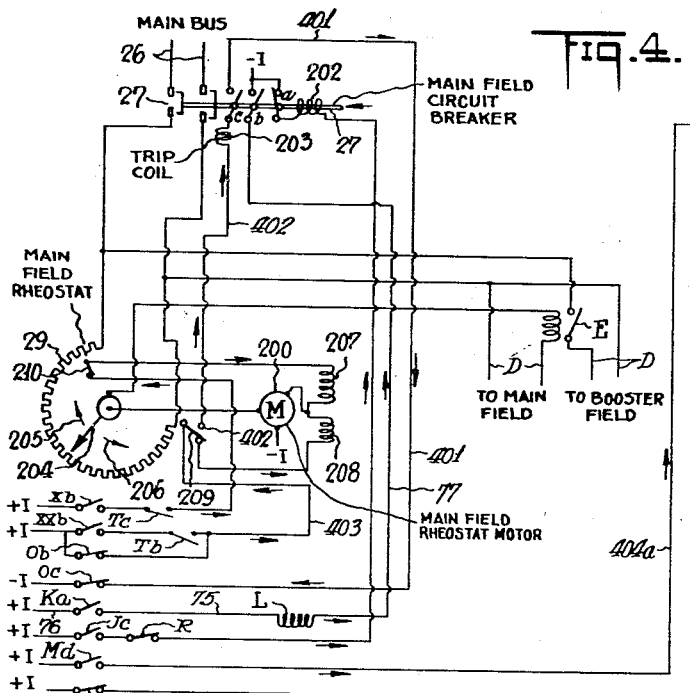
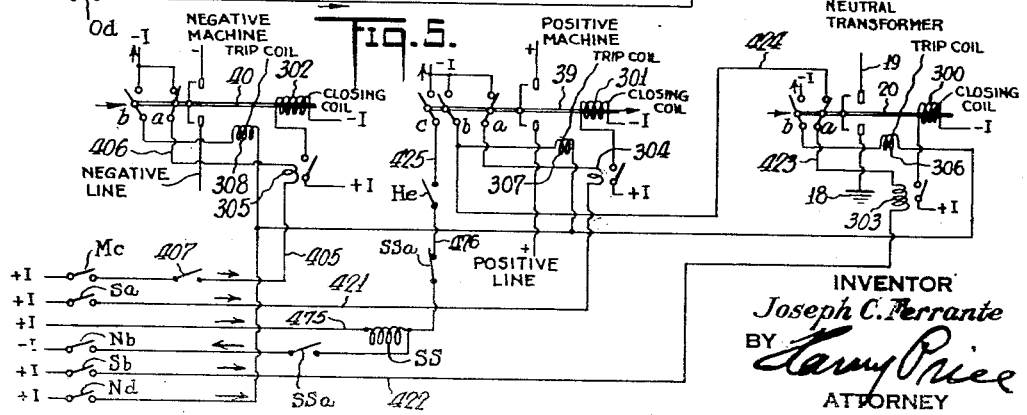
INVENTOR
Joseph C. Ferrante
BY Harry Price
ATTORNEY Patented Aug. 29, 1939

2,170,816

UNITED STATES PATENT OFFICE 2,170,816

SYNCHRONOUS CONVERTER CONTROL SYSTEM

Joseph C. Ferrante, Bronx, N. Y.

Application August 13, 1937, Serial No. 158,881

25 Claims. (Cl. 171—123)

The present invention relates to a synchronous converter control system and it particularly relates to an electrical control system.

It is among the objects of the present invention to provide a control system for synchronous converters which will be simple in design and readily applied to rotary converters equipped for low voltage starting, which will have a low installation cost and be economical in operation, which may be readily connected without the need for additional wiring or conduit systems than are already necessary for manual control of a converter, and which will enable the converter to be started with equal ease remotely or locally.

In the drawings which show one of the preferred forms of the present invention, to which, however, the invention is by no means to be restricted, since these drawings are shown by way of illustration and not by way of limitation, Figs. 1 and 1a show the complete wiring diagram and connections of one installation according to the present invention, Fig. 2 is a detailed wiring diagram of a portion of the construction of Fig. 1, showing the feeder circuit through the machine, Y and delta circuit breakers and the transformer to the converter, Fig. 3 is a detailed wiring diagram of another portion of the arrangement of Figs. 1 and 1a, showing the circuits of the tripping and closing coils of the machine, Y and delta breakers, Fig. 4 is a detailed wiring diagram of another portion of the arrangement of Figs. 1 and 1a, showing the circuits of the rheostat, the rheostat operating motor and the brush lowering and elevating motor, Fig. 5 is a detailed wiring diagram of another portion of the arrangement of Figs. 1 and 1a, showing the circuits of the tripping and closing coils of the negative, positive and neutral circuit breakers, Fig. 6 is a detailed diagrammatic showing of a special type gravity-held, solenoid-thrown relay utilized in the control installation, Fig. 7 is another detailed diagrammatic showing of a special type D'Arsonval relay which may also be utilized.

Referring to Figs. 1 and 1a, the synchronous converter A is provided with a 6-phase input B, a direct current output C and a field supply D.

The three conduits 10 constitute a high tension 11,400 volt 3-phase feeder leading to the machine oil circuit breaker or H-switch 11, which in turn is connected by the conduits 12 to the Y-delta K switch compartment, which contains two electrically interconnected circuit breaking switches, one for connecting the machine in Y at 6600 volts triple phase when starting and the other for connecting the machine in delta at 11,400 volts when the synchronous converter has been brought up to speed and is feeding the D. C. lines.

The construction and operation of the machine oil switch 11 and the circuits the Y-delta switch compartment 13 will be more fully described in connection with Fig. 2.

From the Y-delta switch compartment 13, the conduits 14 lead to a rotary transformer 15 where the triple phase of the feeders 14 is converted into 6-phase, each of the coils have a double winding with the top being primary and the bottom secondary as also will be more fully described in connection with Fig. 2.

The voltage is reduced to 170 volts per phase by the rotary transformer 15 and the transformer 15 is connected through the conduits 16 to the six rings 17 of the rotary converter. The rotary transformer 15 is connected to the ground 18 by the conduit 19 through the circuit breaker 20, which circuit breaker 20 is controlled by a series of relays, as will be presently described.

Two of the three high tension feeder conduits 10 are also connected by the lines 21 to a high tension transformer 22. The transformer 22 is also connected by the conduits 23 (Fig. 1) to an A. C. relay DD, as will be more fully described in connection with Fig. 1. The transformer 22 will step down the voltage of two of the three phases of the feeder 10 at the ratio of about 100 to 1.

The synchronous converter A is provided with a booster field 24 and a main field 25, which fields are connected to 250 volt D. C. bus bars by the conduits 26, the main field circuit breaker 27, the conduits 28, the main field rheostat 29, the booster field rheostat 30, the main field relay E and the conduits D.

The D. C. side of the converter or machine A is provided with the commutator 44, the series field 44a, the negative and positive main brushes 38 and 43, the negative and positive pilot brushes 38a and 43a, and the negative and positive circuit breakers 40 and 39, which breakers serve to connect the machine negative and positive lines 46 and 45 to the main D. C. bus lines 41 and 37.

Referring particularly to the relays which may be employed in controlling the converter A, as shown in Fig. 1a, the coils 31 and 32 of the relays F and G are respectively connected to the positive side 429 of the 50-volt supervisory bus bars, the negative bus 430 being grounded as indicated at 34.

These relays F and G are preferably solenoid relays with inside plungers operating at a definite minimum voltage to close their contacts, and dropping out and opening their respective circuits at about 80% of the pick-up value. The contacts of these relays F and G should preferably have a current breaking capacity of about 1 ampere at 250 volts D. C.

The relays H and SS (Fig. 1) are preferably of the type known as solenoid thrown control switches (see detailed showing in Fig. 6), the coils 700 of which receive plungers 701 which are linked to weights 702, said weights being thrown to one side or the other side by successive applications of current or surges of current through the coils 700. The gravity held element or weight in being thrown from one side to the other will close and/or open a series of switches or contacts as shown at H and SS in Fig. 1a.

The relays H and SS are provided with main contact switches designed to be thrown from up position as shown in Fig. 1a to down position upon a surge of current through their coils (see Fig. 6). Relay H is provided with three contacts on one side and two on the other, while relay SS is provided with six contacts all on one side. The contacts on the relays H and SS should have a breaking capacity of 5 amperes at 250 volts D. C. The contacts of the relays H and SS and the other relays to be described are shown in the position they take when the converter is not operating and before starting.

Relays J, K, L, M, N and O (Figs. 1 and 1a) are D. C. relays, the contacts of which should have a breaking capacity of about 5 amperes at 250 volts D. C. Relay J has four contacts, three on one side and one on the other. Relay K has three contacts all on one side, all of which close together and open together. Relay L has three contacts all on one side, all of which close and open together. Relay M has four contacts all on one side which close and open together. Relays N and O each have four contacts or fingers all on one side which open and close together.

The relays P and Q are direct current relays which are adjustable as to the operating voltage so that they may be operated at pre-determined voltages between 175 and 275 volts. The relay P has four contacts or fingers all on one side which open and close simultaneously. The relay Q has a single contact or finger. The contacts or fingers of the relays P and Q should have a breaking capacity of 5 amperes at 250 volts D. C.

The relay R (Fig. 1) is a time delay relay with one contact or finger, closed when the coil is deenergized. The relay R should be of sufficient capacity to close a 10-ampere circuit at 250 volts D. C. When deenergized it should drop out in less than ten seconds and preferably in six seconds and close its circuit.

The relay S (Fig. 1a) is a time delay relay having two fingers all on one side and it should drop out in about one second after deenergization of its coil. The contacts or fingers on this relay should be able to carry 5 amperes at 250 volts D. C.

The relay T (Fig. 1a) is a time delay relay, which closes two contacts upon energization. A third contact is connected in the circuit of the operating coil of this relay T which is opened upon energization of the coil of the relay. Upon operation, the coil circuit is opened by the third contact which may be mounted on a pullpiece upon which the first two mentioned contacts are mounted. The relay is provided with an adjustable suitable spring which biases the pullpiece toward the deenergized position. The time delay in dropping out is governed by the pull of the spring. This time delay should not exceed two seconds and is preferably one second and shims may also be utilized for adjustment.

The relay U (Fig. 1) is a D'Arsonval type device with a milliammeter coil 411 moving in an electro-magnetic field. The moving contact or contacts are connected to a shaft or element 413 which carries the moving coil 411. This relay is more fully shown in Fig. 7. This relay U should be calibrated with a zero center and have adjustable stationary contacts 414 and 448 which should be closed at 40 millivolts. When the moving coil 411 is connected across a shunt 89 with its stationary coil 411a connected across 250 volt D. C. bus bars, the torque produced will be in a direction determined by the polarity and the direction of current flow to close the circuit of desired contact 414 or 448.

The resistor V may have any value of resistance, but it is desirable that it be set so as to prevent the excessive current flow through the moving coil 411 of the relay U. It is found satisfactory to set the resistor V in series with an adjustable resistance about 5 ohms.

Relays X and XX (Fig. 1a) are time delay relays having a one second time delay drop out and they are equipped with springs enabling adjustment of the time delay period. These relays each have two contact fingers open when the coils are deenergized and closed when they are energized. These relays X and XX should have a breaking capacity of five amperes at 250 volts D. C. A third contact finger may be mounted on the pall piece to give better control of the operation of the rheostat 29.

The relay Z is a one second time delay relay having an operating coil which will operate at 250 volts D. C. The resistance AA is connected in series with the coil of this relay Z in the circuit across the positive circuit breaker 39, to protect the operating coil thereof against high voltages in the order of 400 to 500 volts, and yet not prevent the relay from operating.

The relay BB (Fig. 1a) is a potential regulating relay or a contact making voltmeter. The operating coils of this relay should be able to withstand the D. C. voltage pressure of the converter A and the main D. C. bus section to which they are connected. The coils of this relay BB should have an adjustable resistance to regulate for closer variations of voltage between the D. C. mains and the machine A. A small condenser, if desired, may be used across the contacts of this relay BB to prevent burning of the contacts.

The relay E (Fig. 1) on the booster field circuit is energized by a predetermined value of current flowing through the main field 25.

The finger of the relay E should be able to carry the booster field current indefinitely. This relay E is only utilized where there is a booster field and it may be omitted where there is no booster field to be operated.

The load control relay CC (Fig. 1) is provided with a moving beam which is pivoted at the center and held in position to close the contacts a, by either a counterweight or an adjustable spring 443a. The beam contains a pair of contacts on each end, designed at a and b respectively, which are insulated from the beam. By adjustment of the counterweight or the spring, the beam may be caused to be slightly below balance so that any increase in load will open the contacts a when the coil 443a has a current corresponding to the full load of current on the converter. The coil preferably should be so constructed, that it has a moving core, which passes through the center of it. The core of the coil should be secured to the end of the beam on the coil side so that it will actuate the beam and move the same when the torque of the coil overcomes the mechanical torque of the weight or the spring.

To enable further adjustment, the core may have a plunger adjustable with respect to coil 443.

The relay DD is the only A. C. relay utilized and it may be 110 volt A. C. relay with a rated frequency depending upon the operating frequency of the converter A and the feeder 10. The contacts should close at a predetermined secondary voltage and should drop out of 90% of said rated voltage. The contacts should have a breaking capacity of two amperes at 250 volts, D. C.

Relay EE (Fig. 1a) has a single contact finger which should carry and break a two ampere circuit at 250 volts D. C. The operating coil of this relay should have a time delay drop out of 1 to 2 seconds, to assure operation of the starting relay of another synchronous converter unit, which may be of the same construction as the relay H of Fig. 1a when the system as shown in Figs. 1 and 1a, is overloaded.

It is thus apparent that the present automatic control system employs only 20 to 24 relays as contrasted to the usual manually controlled synchronous converter control system, which must necessarily employ 40 to 45 relays. Of the standard relays, only the relay O is energized when the converter A is idle and no relays operated in the starting sequence are energized when it is operating (not counting the devices DD, U, BB and CC as relays.)

Now referring to the miscellaneous items which make up the control system and which are included in the installation as shown in Figs. 1 and 1a.

The start and stop switch FF on the remote control board 600 (Fig. 1a) should be a drum type of switch closing one circuit when moved to starting position and two circuits when moved to stopping position. The movable drum contacts should be clear of all stationary contacts when in neutral position and there should be an indicator or a flag telling the position in which the switch was last thrown, whether starting or stopping. The switch should be equipped with a spring return so that after each operation the switch will be restored to neutral position as shown in Fig. 1a on the board 600.

In circuit with the relays F and G on the board 600 are the remote control resistors GG which should have a resistance sufficient to deenergize the coils of the relays F and G to a point where they will drop out instantly upon movement of the switch FF to neutral. The terminals on the resistors are preferably set at such a point that the lights HH will give sufficient illumination. The lamps HH should preferably not take more than 0.03 ampere and they are preferably telephone or six volt flash light lamps.

The supervisory control bus 429—430 should be of a potential which will suit the operation of the relays F and G. Since the weights of the plungers of these relays F and G determine the current necessary for operation, it is generally desirable to use as low a voltage as possible, since in any case the relay will take 5 to 7 watts for instantaneous operation.

The elements JJ are copper oxide half wave rectifiers and they should be able to carry 0.09 ampere which is the current rating of the coils of the relays P and Q respectively.

The local control switch KK may be a drum type switch with a double throw single contact element. The manual and automatic switch LL may be similar in construction to the local control switch KK and it may be equipped as the remote control start and stop switch FF.

The main control bus I is preferably maintained at 250 volts D. C. It should be independent of the supervisory bus 429—430, the field supply 26 or the D. C. mains 37—41. The 250 volt control bus I should supply all the relays and their coils and auxiliary apparatus except the relays F and G, which are supplied from the supervisory 50 volt D. C. bus 429—430 and the relay DD which is supplied with A. C. from the transformer 22.

In referring to the contacts of the various relays as shown upon Fig. 1, these contacts are successively indicated by small letters starting from the coil and in the detail drawings of Figs. 3 to 5, the contacts are indicated by the same capital letters as the main relay in Figs. 1 and 1a, followed by small letters indicating the respective finger or contact.

Referring to the detailed showing in Fig. 2, which shows the feeder circuits of the circuit breaker switches 11, the Y-delta compartment 13 and the rotary transformer 19, it will be noted that the main oil circuit breaker 11, is provided with an a, b and c circuit closure elements for the each of the lines a, b and c of the main 11,400 volt feeder 10.

The circuit breaker 11 is closed by means of the closing coil 100 diagrammatically indicated and when closed it will connect the main feeder lines 10 to the lines 12, leading to the Y-delta compartment 13. The lines 12, from the switch 11 lead either to the delta switch 101 or the Y switch 102 and these switches are electrically interconnected with each other and with the switch 11 in a manner which will be subsequently described in connection with Fig. 3.

Both the delta switch 101 and the Y switch 102 are provided with three contact fingers or elements a, b and c, which connects the lines 12, respectively to the lines 14, leading to the rotary transformer 15. The circuit breakers 101 and 102 are respectively provided with the closing coils 103 and 104. The circuit breakers 11, 101 and 102 are also provided with trip coils best shown in Fig. 3. It will be noted that the Y of the circuit breaker 102 has a common connection 111.

The transformer 15 is provided with three main primary coils 105, 106 and 107. Each of these transformer coils 105 to 107 is coupled with two secondary coils 108, 109 and 110 respectively, which supply 6 phase current to the synchronous converter A through the conduits B, as indicated in Fig. 1.

A common connection is provided for the secondaries at 19, which common connection is controlled by the circuit breaker 20 having the closing coil 112 and connected to the ground 18 (see Figs. 1 and 2).

In Fig. 3 are shown the electrical connections to the closing coils 100, 103 and 104, to the trip coils 113, 114 and 115 and to their auxiliary closing coils 116, 117 and 118 of the circuit breakers 11, 101 and and 102, all respectively.

The connections of the positive and negative sides of the 250 volt D. C. main bus bar I of Figs. 1 and 1a to the various circuits indicated in Fig.

3, are designated by plus or minus I to simplify the showing of the wiring.

The main closing coils 100, 103 and 104, auxiliary closing coils 116, 117 and 118, the trip coils 113, 114 and 115, the various auxiliary contacts, a to c, associated with the circuit breakers 11, 101 and 102 are not mounted on the main control panel board with the relays, G to SS shown in Figs. 1 and 1a, but are included in the casings of the circuit breaker installations. These various main and auxiliary closing and trip coils and contacts actuated by or actuating the circuit breakers are indicated diagrammatically in Figs. 1 and 1a in certain instances as connected in circuit various contacts of the relays G to SS.

Referring specifically to the circuit breakers 11, 101 and 102, these circuit breakers each actuate four contact fingers, a to d, two of which are closed when the circuit breaker is closed and two of which are open when the circuit breaker is open. The position of the contacts in Fig. 3 is that which obtains when the circuit breakers 11 and 101 are all open, as shown in Fig. 2, before the converter is started from the remote board 600 (Fig. 1a).

As indicated in Figs. 2 and 3, the auxiliary closing coils 116, 117 and 118 when energized, close the relay fingers 119, 120 and 121 in series with the closing coils 100, 103 and 104 and close said coils in circuits across the 250 volt main control bus bar I. (See Figs. 1 and 1a.)

The various respective contact fingers on the breakers, Fig. 3, are indicated by the small letters, starting from the closing coils.

The same lettering system is also used for the contact of the relays shown in Figs. 1 and 1a, where the contact fingers of the relays G to SS are shown in Figs. 3 to 5 apart from their coils, in Figs. 1 and 1a, and where the contact fingers of the seven circuit breakers of Figs. 3 to 5 are shown apart from their closing coils or auxiliary circuits in Figs. 1 and 1a, they are respectively designated by the capital letter or numeral of the relay or circuit breaker followed by the small letter by which they are designated or would be designated if shown in detail.

Returning to Fig. 3, the auxiliary interlocking relays 119 and 121 are provided with the coils 120 and 118 so connected in circuit with the contact fingers as to assure that the Y circuit breaker 102 will be closed only when the delta circuit breaker 101 is open and vice versa, and that the breaker 101 will only be closed if the breaker 11 is closed.

In Fig. 4 are shown diagrammatically the closing and trip coil circuits and the connections to the auxiliary contacts of the main field circuit breaker 27 and the various circuit connections for adjusting the main field rheostat 29 by its actuating motor 200 and for operating the motor 201 for raising and lowering the brushes on the D. C. commutator 44.

As indicated in Fig. 4, the field circuit breaker 27 controls three contact fingers and is provided with a closing coil 202 and a trip coil 203. The rheostat contact lever 204 is shown in intermediate position for better showing, but before starting it should be in full weak position to the extreme right. Movement in the direction indicated by the arrow 205 will cut out resistance making the field strong, and movement in the direction 206 will cut in resistance making the field relatively weak.

The motor 200 is provided with a two series connected field coils 207 and 208, the coils 207 and 208 being respectively subject to being cut out by the switches 210 and 209. This switch 209 will be tripped out, stopping the motor 200, when the main field rheostat contact arm 204 is in full weak position. The lever 204 is also limited at full strong position by the switch 210, will be opened at this point by the extreme upward swing of the lever 204 to stop the motor 200. The motor 200 may also be a shunt wound motor, but a series motor is shown because of the greater simplicity of the wiring with such a series motor.

The brush raising and lowering motor 201 is also provided with a split series fields 211 and 212, which fields are respectively connected to the switches 213 and 214, which are controlled by the drum contact switch 215 to stop of the motor 210 when the brushes have been raised or lowered to their extreme positions.

The auxiliary switches 213a and 407 are also controlled by the drum switch 215 and opened and closed with the motor control switches 213 and 214 respectively.

In Fig. 5 are shown the corresponding circuit connections associated with neutral circuit breaker 20 and with the negative and positive circuit breakers 39 and 40 respectively.

Referring to Fig. 5, the circuit breakers 20, 39 and 40 are respectively provided with closing coils 300, 301 and 302, with auxiliary closing coils 303, 304 and 305, and with trip coils 306, 307 and 308.

The neutral circuit breaker 20, when open closes one contact finger a and opens another contact finger b, the reverse being the case when the circuit breaker is closed. The positive circuit breaker 39 closes one contact finger a and opens two fingers b and c when open, with the reverse taking place when closed. The circuit breaker 40 closes one contact finger a when open, and opens another b with the reverse taking place when the circuit breaker is closed. In both Figs. 4 and 5 the contact fingers of relay coils G to SS are indicated by the small capital letters and small letters as in Figs. 1 and 1a.

To first briefly summarize the system of the present invention, to start the device from a remote point, namely the panel board 600 which is connected by the three lines 60, 434 and 601 to the main control board, the drum switch 54 is moved to the right to complete a circuit between the conduits 50 and 53. When this occurs the relay G will be energized, in turn energizing the relay H, the contact a of which will be thrown over from its upper position to its lower position.

When the relay H is energized and actuated, it will light the white starting light 55 and extinguish the green stopping light 56.

Energization of the relay H will energize the relay K which will close the Y switch 102 through the circuit best shown in Fig. 3. The time delay relay R will be energized simultaneously with the relay K.

Energization of the relay K will energize the relay J which will close the machine switch 11 through the circuit shown in Fig. 3. Energization of the relay J will deenergize the relay R and there will be a six second interval before the relay R drops out due to its delayed action. When the relay R falls out the main field circuit breaker 27 will be closed through the circuit best shown in Fig. 4.

The contacts of the main field circuit breaker 27 will energize or make the circuits from the pilot brushes 38a and 43a through the copper oxide rectifiers JJ.

If the circuits through the copper oxide rectifiers are established in such a way as would result from incorrect polarity at the brushes 38a and 43a, the relay Q (Fig. 1) will be energized and will energize the relay X (Fig. 1a), which will in turn energize the relay T (Fig. 1a), which will actuate the main field rheostat 29 (Figs. 1 and 4) to strengthen the field until a pole is slipped and the polarity is corrected.

When the polarity is corrected, or if the polarity is initially correct, the relay P will be energized inside of the relay Q. The relay P when energized will energize the polarity checking relay Z (Fig. 1), and also the interlocking relay 119, (see Fig. 3), which latter will cause the Y circuit breaker 102 to open and then the delta circuit breaker 101 to close. At the same time, actuation of the relay P will energize the relay X and the relay X will again energize the relay T, increasing the strength of the field by decreasing the resistance of the field rheostat 29 through the motor 200.

When the interlocking relay 119 is actuated to open the Y breaker and close the delta breaker, the relay M will be energized and this will operate the motor 201 to lower the main brushes 38 and 43 (see Fig. 4). When the main brushes 38 and 43 have been lowered, the negative circuit breaker 40 will be closed through the circuit established by the relay M and the brush checking contact 407.

The relay M will also establish a circuit across the open positive circuit breaker 39 which will operate the relay U (Fig. 1) which in turn will operate the relay S (Fig. 1a). The relay S closes the positive circuit breaker 39 and then the neutral circuit breaker 20, the positive circuit breaker establishing the circuit to energize and throw over the operating relay SS (see Fig. 5).

The operating relay SS (Fig. 1a) will light the red, operating light 57 extinguishing the white, starting light 55, and throw the H relay to its initial position, and will energize the relay BB, which will vary the field, weakening or strengthening it through the relays X and XX to accommodate the load. The relay SS will also energize the relay U, which will operate the relays EE and H' (Fig. 1a) when another machine should be thrown upon the line.

Tripping out of the relay H by the relay SS will have the effect of deenergizing the relay K. This will deenergize the relay L, which will deenergize the relay P, which will deenergize the relay M. This will complete the operation of putting the machine on the line and this entire operation and starting sequence will take approximately 20 seconds. Tripping out the machine, in case of a dead feeder or dip in voltage thereof when starting, or upon reversed polarity after closure of the delta breaker, will be accomplished by the relay Z. The relay DD will operate to actuate the relay Z upon starting when the main feeder is dead or when there is a dip exceeding a certain predetermined percentage of the voltage on the feeders 10. The relay U will operate upon starting or operating, when there is a low load, say about 25%, or when there is a reverse current into the D. C. end of the machine to trip out the machine A from both the D. C. and A. C. ends. The relay CC will operate to trip out the machine from both ends when there are sudden shifts in the load or hunting effects during operation.

The tripping out relays Z, DD, U and CC are all directly or indirectly connected in parallel to the energizing coil of the relay N. This relay will close its contacts a, b, c, and d when any of these tripping out relays above described are operated.

Operation of the relay N upon starting, for example, by the relay Z in case of reverse polarity after the delta switch 101 has been closed, will throw out the main switch 11 and the delta switch 101 and energize the relay O which will operate motor 200 to weaken the field before throwing out the field breaker 27. In both cases, the relay N will throw over the relay SS from operating position to starting position, extinguishing the red light 57. The energization of the relay O will cause illumination of the green light 56.

Now to study the circuits in detail, in starting the drum switch FF, as shown in the upper right hand corner of Fig. 1a, will be thrown so as to close the circuit between the lines 50 and 53. The green light 56 will be extinguished and the white light 55 illuminated. Although the starting, stopping and operating lights 55, 56 and 57 are respectively white, green and red, and are preferably telephone lamps each consuming about 0.025 ampere, other colors and types of lamps, of course, may be utilized to indicate the status of the system.

Before the switch 54 is thrown to the right to initiate starting of the machine, there will be a circuit from the positive side 429 of the 50 volt supervisory bus 429–430 at the top of Fig. 1a through the line 58, the relay coil G, the line 59, the contact a of the relay O, the lines 60 and 61, the element 62 of the resistor GG to the ground 63. Since there will be a substantial voltage drop across the resistor element 62, the tap for the green lamp should be set so as only to supply the necessary voltage to this lamp to give illumination. Although there is sufficient current passing through the coil G in series with the resistor 62 to illuminate the lamp 56, this in unsufficient to operate the relay G.

It will also be noted, when the control system is in inoperative position as shown in Figs. 1 and 1a and the switch 54 is open, that the machine circuit breaker 11 has its a and b contacts closed (see also Fig. 3). Closure of contact b of the circuit breaker 11 will energize the coil of the relay O (see Fig. 1a), closing the switches or contact fingers a, b, c and d of said relay O (see Figs. 1a and 3).

This circuit through the coil of the relay O and the contact 11b will take about 0.125 ampere at 250 volts, that is about 30 watts between operation.

As soon as the switch 54 is moved to the right, sufficient current then will flow through the circuit composed of the line 58, the coil G, the line 59, the contact Oa, the line 60, the line 50, the switch 54, the line 53 and to ground 63 to operate the relay G. The energizing current should be at least .05 ampere and is preferably .08 ampere.

Closure of the switch G will connect the relay H across the 250 volt control bus, the positive side of which will be indicated as plus I and the minus side of which will be indicated as —I. The closure of the relay G will then close a circuit from plus I through the line 67 (see Fig. 1 toward the right upper portion), the line 66 (transfer to Fig. 1a), the coil of the relay H, the normal upper contact of the finger a of the H relay, the line 65, the checking switches 20c, 39c, 11e, 213a, 21d, (which respectively are opened unless the neutral breaker 20, the positive and negative breakers 39 and 40, the field breaker 27, and the machine breaker 11 are opened, and the brushes 38 and 43 are elevated) the contact 707 of the relay G, and the line 64 to —I.

As soon as the relay H has been energized, the contact Ha will immediately be thrown over from the upper position, where it connects the line 66 to the coil of the relay H and the line 65, to the lower position (in which it remains during starting) where it connects the line 66 to the coil H and the line 400 to the contact SSb and then to —I. The latter circuit is only energized when the starting operation has been completed, the machine is put on the line and the contact SSa closes, at which time the switch H is thrown back to its initial position as shown.

In Fig. 6 is diagrammatically shown the relay H (which also functions similarly to the relay SS), said relay H having an energizing coil 700, a solenoid 701 received in said coil, a weight 702 designed to be thrown from full line position to dot and dash position or vice-versa upon each surge of current through the coil 700. The throwing of the weight, simultaneously opens the circuit energizing the coil H through the upper contact a, and sets up another circuit (that is the circuit including the line 400) through which the coil 400 may next be energized. The weight 702, it will be noted, is connected by the link 703 to the plunger 701 and is pivotally mounted at 704. The normal closed contact 705 may correspond to the upper contact Ha (or SSa), while the dot and dash contact 706 may correspond to the lower contact Ha (or SSa), which is the normal position during starting after the weight has been thrown from the full line position of Fig. 6 to the dotted line position of Fig. 6. The contact 707 may be considered as functioning as the contact of the relay G, while the contact 708 is a diagrammatic representation of either the contact a of the relay N or the contact b of the relay SS (see Fig. 1a).

The weight 702 may be connected by suitable linkages to the contacts b, c, d, e and f of the relay H, the contacts b and c being closed when the contact a is in upper position or in the position 705 of Fig. 6 and the contacts d, e and f are closed when the contact a is in lower position or in position indicated by the dot and dash line at 706 in Fig. 6.

Energization of the coil of the relay H operating to throw the weight 702 over, as shown in Fig. 6, will at the same time operate to open the switches or contacts b and e and close the contacts d, e and f.

At this time the Y switch 102, the delta switch 101, and the machine switch 11 are all open and the Y switch is the first switch to be closed through its closing coil 104 (see Fig. 3). To actuate the Y circuit breaker 102, it is necessary to energize and close the relay K.

The relay K is energized by operation of the H relay through the circuit plus I, the line 78, the contact a of the relay DD (which relay is energized by the main feeder 10 through the lines 23), the line 68, the contact f of the relay K, the line 69, the coil of the relay K to —I.

As soon as the relay K has been closed (referring to Fig. 3), the contact Kb is closed, establishing a circuit plus I, contact Kc, the contact a of the Y circuit breaker 102, the auxiliary energizing coil 118, the b contact of the delta circuit breaker 101 to —I, the contact b of the circuit breaker 101 being closed when the circuit breaker is open.

Energization of the auxiliary coil 118 will close the switch 121, establishing a circuit from plus I to —I through the energizing coil 104 (see Fig. 3).

Closing of the Y circuit breaker 102 opens the contacts a and b and closes the contacts c and d, these contacts being respectively connected to open and close substantially at the end of the movement of the circuit breaker.

Now the main machine switch 11 is closed by energization of the coil of the relay J. This is accomplished (see Figs. 1 and 3) by closure of the contact Kb which closes a circuit from plus I through the coil J and the contact 102d of the Y circuit breaker to —I. It is thus apparent that the coil J is energized as soon as the Y circuit breaker 102 is closed by the closure of the relay contact Kb.

To close the machine breaker 11 the energizing circuit (see Fig. 3) extending from plus I through the contact Jb, the auxiliary energizing coil 116, the contact 11a of the machine breaker is closed to —I. The auxiliary energizing coil 116 will close the switch 119, establishing a closed circuit through the main closing coil 100 from plus I to —I, closing the machine switch 11. The contacts 11a and 11b and 11c and 11d are respectively designed to open and close just before the breaker closes in the manner previously described in connection with the circuit breaker 102.

This will apply rotating 6-phase 100 volt to the rotor of the synchronous converter A through the transformer 15 and the lines B, as shown in Figs. 1 and 2. The rotor then will start as an induction motor and quickly pick up speed.

For a space of 6 seconds, the main field 25 should not be energized during which time the rotor is picking up speed and this 6 second delay is achieved by the time delay relay R. It will be noted that the coil of the relay R is fed from the same line 69 as the coil of the relay K, the current flowing through to —I past the normally closed contact a of the relay J. It will be noted that the contact of the relay R is normally closed and is in series with the normally opened contact c of the relay J, both contacts being in series with the coil 202 of the main field circuit breaker and the contact 202 a of the main field circuit breaker (see Fig. 4).

However, energization of the relay R which will occur simultaneously with the energizing of the relay K will open the energizing circuit for the coil 202 upon the main field circuit breaker through the contact of the relay R before it is closed through the contact b of the relay J. As soon as the relay J, however, has been energized the contact a will be opened, deenergizing the coil of the relay R. The contact or finger of the relay R, however, will not fall back to close the energizing circuit of the coil 202 of the main field circuit breaker, because of its time delay action, which is preferably set for about 6 seconds.

When the 6 seconds, however, has passed, the switch of the relay R will fall back, immediately closing a circuit through the coil 202, which will be energized, and the main field circuit breaker will be closed, applying a weak field to the synchronous converter A through the field 25.

The contact lever 204 of the main field rheostat will be turned to full strong position in direction of the arrow 205.

After the machine speeds up and reaches synchronous speed with a weak field, the next step is to open the Y circuit breaker 102 and close the delta circuit breaker 101.

Before this is done, it is necessary to check the polarity at the D. C. side of the rotor A. This is done by providing pilot brushes 38a and 43a (see Fig. 1), which are always down and which are connected to the copper oxide rectifiers JJ through a circuit which passes either through the relay coil Q or the relay coil P, the relay coil Q being energized when the polarity is wrong and the relay coil D being energized when the polarity is correct.

First, assuming the polarity is wrong, current will flow from the negative brush 43a, as indicated by the dotted line arrow in Fig. 1, through the line 71, 72, the coil Q, the copper oxide rectifier element 73 through the contact a of the relay L, which in the meanwhile has been energized through the contacts Ka and 27b. From the contact La the circuit will continue through the line 78, the contact Jd back to the normally positive brush 38a (which is now incorrectly negative).

The L coil has been energized in the meanwhile from plus I through the line 76 (see Figs. 1 and 4), the contact Ka, the line 75, the line 77, the contact 27b, to –I. The contact 27b will not be closed until the main field circuit breaker has been closed.

Then this will close the relay switch Q which will energize the coil of the relay X (see Fig. 1a), through the circuit, established from plus I, through the line 68, the contact Hf, the lines 69 and 79, the relay switch Q, the line 80, the contacts a of the load limiting relay CC (see the bottom right of Fig. 1), the line 81, the coil of the relay X (see Fig. 1a) to –I. The energizing circuit of the relay X will be immediately opened at its third contact Xc shown for simplicity in the circuit 81, but the time delay action will hold the contacts a and b closed for one second. Energization of the relay X will energize the relay T through the circuit, plus I, the line 84, the contact Ta, the line 83, the contact Xa, the line 82 to –I. As soon as the relay T is energized, it will open its energizing circuit to the contact Ta, but due to its time delay action, the contacts b and c will remain closed for about one second even though the coil of the relay T is deenergized.

Closure of the contact Tc together with the contact Xb will initiate operation of the field rheostat motor 200 through the circuit (see Fig. 4), plus I, the contacts Xb and Tc, the switch 210, the series field 207, the rotor of the motor 200 to –I.

The motor 200 will now move the contact lever 204 in the direction 205, thus strengthening the field 25 of Fig. 1 by cutting out resistance. In a second the operation of the motor 200 will be stopped by dropping out of the contact Tc, since the coil T has been deenergized.

However, if the relay Q is still energized due to continuing incorrect polarity, the coil X will again be energized, the contact Xa will again energize the coil of the relay T with the result that there will be a series of energizations of the coil T and a series of operations of the motor 200, strengthening the field by moving the contact 204 of the rheostat in the direction 205.

As the field strength increases, it tends to buck the rotating field and shortly the machine will slip a pole and the polarity will correct itself with the brush 38a becoming the positive brush and the brush 43a becoming the negative brush.

As soon as the polarity has corrected itself, or if the polarity is initially correct, the relay P will be energized through the circuit, from the pilot brush 38a, the contact Jd, the line 78, the contact La, the element 74 of the copper oxide rectifier JJ, the coil P, the lines 75 and 71, to the negative pilot brush 43a.

As soon as this is done, the Y breaker 102 is opened and the delta breaker 101 is closed, applying full operating voltage to the rotor of the synchronous converter. To open the Y breaker, a circuit is set up through the trip coil 115 by means of the interlocking relay coil 120. The interlocking relay coil 120 is energized from plus I, as shown upon Fig. 3, by the contact Pd and the contact 11d to –I, the contact 11d being on the machine breaker 11 and not being closed until the machine breaker has been closed.

Energization of the interlocking relay coil 120 will close the switch 119, closing a circuit from plus I, the switch 119, the line 88, the Y circuit breaker contact 102b, the delta circuit breaker contact 101a, the auxiliary energizing coil 117, and the machine breaker contact 11d to –I (see Fig. 3).

However, the delta switch cannot close until the Y switch has been opened because its auxiliary energizing coil 117 is on the circuit, plus I, switch 119, line 88, contact 102b, contact 101a, coil 117, contact 11d to –I, which circuit is opened at 102b on the Y circuit breaker as long as the Y circuit breaker is in closed position. However, when the Y circuit breaker has been opened and the contact 102b has been closed, the current will flow through the auxiliary energizing coil 117, closing the switch 130. Closing switch 130 will close the energizing circuit, plus I, switch 130, coil 103 to –I which will close the delta circuit breaker 101.

After the delta breaker is closed, the brushes 38 and 43 are moved down to the commutator 44, then the negative brush is closed, finally the positive breaker is closed and the machine is on the line.

However, first it is desired to check the polarity after the delta circuit breaker has been closed and before the brushes have been moved down in case a sudden reversal has taken place. The checking operation is accomplished primarily through the relay Z in the upper right hand side of Fig. 1 and through a circuit including the resistance V which is placed in series with the resistance AA across the open positive circuit breaker 39. If the polarity is wrong, the relay Z will be energized and will open the delta circuit breaker 101, the machine circuit breaker 11, and the main field circuit breaker 27.

Starting from the positive side of the line 41 the positive side of the checking circuit (indicated by dotted arrows) extends through the line 85, the contact Pb, the line 86, the tapped resistor V, the low resistance shunt 89, to the line 45.

If the line 37 is of the same polarity as the line 46, substantially no current will flow through this circuit, but if it is of different polarity, there will be about 400 volts difference which will cause sufficient current to flow to energize the coil of the relay Z.

The negative side of the checking circuit extends through the contacts Lb and Lc and the lines 91 and 92 between the negative line 37 and the pilot brush 43a.

The current flowing through the circuit will be limited by the resistance V but there will be sufficient current to energize the coil Z, close the contact of the relay coil Z. Closure of the relay Z will energize the relay N (see Fig. 1a) and throw out the various circuit breakers 11, 101 and 102 (see Fig. 3).

At the same time if the main feeder 10 goes dead or if the voltage thereof dips to say 90% of its value, the contact b of the relay DD will close, this contact being in parallel with the contact Z, will close circuit to energize the relay N.

The circuit in either case which energizes the coil of the relay N when the relay Z is energized extends from plus I through the coil N (Fig. 1a), the lines 93 and 94, the switch Z, the line 93 back to —I.

Operation of the relay N will also cause a tripping out of the delta circuit breaker 102, the field circuit breaker 27 and it will actuate the field rheostat operating motor 200 to lower it to full weak position, following which the main field circuit breaker 27 will be tripped out. At the same time the operation of the switch N will throw out the main contact a of the relay H from the lower position to the upper position. At the same time the white light 55 will be extinguished and the green light 57 will be illuminated.

It will be noted by referring to Fig. 3, that the machine switch 11 is electrically interlocked with the delta circuit breaker 101 through the circuit plus I, the contact 101c, the trip coil 114, the line 97, the contact 11b back to —I. Therefore whenever the main machine switch and circuit breaker 11 is opened, the trip coil 114 of the delta switch will also be actuated to throw out the delta circuit breaker.

At the same time, as soon as the main circuit breaker 11 opens, the relay O is energized through the contact 11b (see Fig. 1a) and the contact Oc will close. This will close the circuit from plus I through the contact Ob (see Fig. 4) through the line 403, the switch 209, the field 208, and the motor 200 to —I (which motor will operate to weaken the field until the limit switch 209 is opened by the arm 204).

As soon as the switch 209 has been opened by the movement of the rheostat arm 204 to its fullest extent in the direction 206, the main field circuit breaker 27 will open. The main field circuit breaker should not open until the rheostat has been opened to full weak position, to lessen the spark across the gaps to the maximum extent.

The machine field circuit breaker is opened through the trip coil 203 and by the circuit which is established (see Fig. 4), from the plus I to Ob to the line 403, the switch 209, the line 402, the trip coil 203, the contact 27c (closed when the switch is closed), the line 401, the contact Oc to —I.

If the machine is tripped out, die to reversed polarity after the delta switch has been closed in the manner just described, it is desirable that suitable provision be made to prevent the machine from being restarted from the remote control board 600 until the field has run down to full weak position and the main field circuit breaker has been thrown out. This is accomplished by placing an auxiliary contact finger 27d of the main field circuit breaker on the line 65 as best shown at the top of Fig. 1a.

This contact is not shown in Fig. 4 in order to simplify the wiring diagram.

By reason of this control, it is not possible to initiate the operation of the machine again by the switch FF on the remote control board 600 until the main field circuit breaker 27 has opened, which in turn will not result until the field has been turned to full weak position opening the switch 209.

However, if the polarity has been correct and there is no current flow through the checking circuit shown on Fig. 1, in sequence, brushes 38 and 43 will first be lowered, then the negative circuit breaker 40 will be closed, the positive breaker 39 will be closed, the neutral breaker 20 will close and the switch H will be thrown back to its initial position.

The brushes 38 and 43 are lowered by the motor 201 shown on Fig. 4 and through the d contact of the relay M. The relay M is energized by the circuit indicated best on Fig. 1, the circuit extending from plus I past the contact Pc through the coil of the relay M, past the contact 101d back to —I. The relay M, then in operation, will establish a circuit from plus I through the contact Md, through the line 404a, the contact 213, the series coil 211 through the motor 201 back to —I. When the brushes have been lowered to the full extent, the contacts 213 and 213a (on the line 65, Fig. 1a) will be opened, opening the brush-elevating motor circuit and the contacts 214 and 407 will respectively be closed by operation of the drum switch 215. The contact 214 is on the brush elevating circuit, while the contact 407 is upon the negative breaker closing circuit, and the negative breaker therefore cannot close until the brushes have been lowered and the switch 407 (see Fig. 5).

The negative breaker is primarily closed by the contact c of the relay M and through the contact 407 shown upon Fig. 4 controlled by the drum switch 215. The closing circuit for the negative circuit breaker 40 is best shown upon Fig. 5 and it extends from plus I through the contact 407, the line 405, the auxiliary closing coil 305 and the auxiliary contact 40a back to —I. The auxiliary closing coil 305, upon being energized will establish a circuit through the main closing coil 302.

The positive circuit breaker will be closed by operation of the relay U, see Fig. 1, through operation of the relay S, see Fig. 1a. Before such positive breaker is closed the voltage on the machine line 45 should be higher than the voltage on the bus 41 so that the current will flow from the line 45 through the shunt 89 through the line 408, through the resistance V, the line 86, the contact Pb, the line 85, to the positive bus 41 (as indicated by the solid arrows).

Preferably, there should be 5 volts differential between the lines 45 and 41 before closure of the positive circuit breaker. The resultant current will give a sufficient voltage drop from the line 408 up to the adjustable contact 409 (say about 40 millivolts).

Such a drop will set up a current from the positive line 45, the shunt 89, the line 410, the movable coil 411 of the relay U, the line 412, the contact Ma, the line 87 to the adjustable contact 409 on the resistance V. This will move the contact 413 to close the contact 414 establishing an energizing circuit for the relay S (Fig. 1a) through the circuit from plus I, the line 67 (middle Fig. 1), contact DDa, the line 68, the contact Hf (Fig. 1a), the line 69, the line 79 (back to Fig. 1), the line 418, the contact Mb, the line 417, the coil of the relay S (Fig. 1a), the line 416, the contact 414, the swinging contact 413, the line 415, back to —I.

In case of a dead feeder 10 or dip in its voltage, the contact DDa will be open and positive breaker cannot close.

The relay contact Sa and Sb in closing will establish energized circuits for the auxiliary closing coils 304 and 303 of the positive and neutral breaker 39 and 20. If the voltage of the line 45 at first is not sufficiently high, the field strength will be increased by operation of the relay X through the circuit established by the relay P from plus I, through the line 67, the contact DDa, the line 68, the contact Af, the lines 69, 79 and 419, the contact Pa, the line 80, the contact CCa, the line 81, the relay coil V, and the line 420 to —I.

When the voltage at the brushes 38 and 43 has been sufficiently increased by increased field strength, the contacts 413 and 414 will close.

The positive circuit breaker will be closed by the contact Sa through the circuit shown on Fig. 5 and extending from plus I, the contact Sa, the line 421, the auxiliary energizing coil 304, and the contact 39a back to —I.

The neutral circuit breaker 20 is closed by the contact Sb (Fig. 5). This contact when closed will establish a circuit from plus I, the contact Sb, the line 422, the auxiliary closing coil 303, the line 423, the contact 20a, the line 424, and the contact 39b back to —I. It will be noted that this circuit cannot be energized until the positive breaker has closed as otherwise circuit would be open at the contact 39b. Therefore, the neutral breaker 20 cannot close until the positive breaker has closed. The neutral breaker 20 will compensate for lack of balance on the lines 37 and 41.

Then as the last step in the starting sequence, the relay SS is thrown over so that its contact $a$ will be in lower position, the relay H will be returned to its original position (see Fig. 1a).

This operation of the relay SS is accomplished by the energizing circuit extending from plus I through the line 475 (see Figs. 1a and 5), through the coil of the relay SS, the upper contact $a$, the line 476, the contact He, the line 425, and the contact 39c back to —I.

As soon as this energizing circuit is established, the contact $a$ of the relay SS will be thrown to its lower position and the contacts $b$ to $g$, all inclusive, will be closed.

These contacts in closed position will establish circuits controlling the operation of the converter A.

The contact SSb will throw over the relay H; the contacts SSc and SSd will control the load of the converter by operating the relays X or XX to raise or lower the field strength of the converter A; the contact SSe will control the operation of the relay U which will operate to start an adjacent unit when a certain load is taken from the converter A; the contact SSf will cooperate with the relay U in establishing a circuit to energize the relay EE; and the contact SSg will operate the red light 57 and keep such light illuminated on the remote control board while the converter is operating.

To trace these various circuits in detail, the circuit which operates the relay H extends from plus I through the lines 67 and 66, the coil 700 of the relay H, the bottom contact Ha, the line 408, the line 426, the contact SSb to —I.

This circuit will throw the contact $a$ of the relay H to its upper position and this will extinguish the white light 56 which indicates that the starting sequence has ended. The starting light 55 will be extinguished by opening of the contact Hd.

In respect to the contact SSc, this contact will establish an energizing circuit to the relay X to increase the field, which circuit will be closed at the relay BB when the voltage of the machine falls below voltage of the line. The lines 45 and 46 are connected to the left hand coil 481 of the relay BB and the lines 37 and 41 are connected to the right hand coil 480 of the relay BB (see particularly Fig. 1a).

Assuming that the machine voltage is too low, the beam of the relay BB will be drawn down to the right, closing the contact BBa. The circuit then will be plus I, the lines 67 and 66, the contact Hb, the line 466, the point BBc, the contacts BBa, and SSc, the line 427, the contacts CCa, the line 81, the contact Xc, the coil of the relay X, and line 420 to —I.

On the other hand, when the line voltage is too high the coil 481 of the relay BB will tip the beam 482 down toward the left, closing the contact BBb. This will establish the energizing circuit for the relay XX up to BBc in the manner before described and from BBc through the cross bar 482, the contact BBb, the contact SSd, the contact XXc, the coil XX and the line 420 back to —I.

As previously described, the operation of the relay X causes closing of the contacts Xb and Tc establishing a circuit which will operate the motor 200 of Fig. 4 to move the rheostat contact arm or lever 204 in the direction 205.

On the other hand, operation of the relay XX will close a circuit including the contact XXb, the contact Tb, the line 403 (see Fig. 4), the switch 209, the field 208 and the motor 200. The motor will turn the rheostat arm 204 in the direction 206 weakening the field.

As was stated before, both the relays X and XX will immediately be deenergized by the opening of contacts Xc and XXc respectively when they are energized, and their time delay action will hold their contacts $a$ and $b$ closed for about one second.

In either case the field will be increased or decreased until the voltage across the lines 37 and 41 will be the same as the voltage across the lines 45 and 46.

The contact SSe which controls starting of the adjacent unit, operates the circuit extending from the shunt 89, through the line 410, the coil 411, the lines 412 and 438, the contact SSe, and the line 439 back to the shunt 89. If the current through the shunt 89 corresponds to a predetermined percentage load, say varying from 80 to 100 percent, at which it is desired to throw in the next converter unit, there will be a voltage drop sufficient to cause current to pass through this circuit in an amount which will swing the contact 413 to close the contact 414. The solid arrows on this circuit indicate the direction of the flow of current when the next unit is to be thrown upon the line.

Closure of the contacts 413 and 414 will establish a circuit from plus I through the line 441 (see Fig. 1a), the coil EE, the contact SSf, the line 440, the contacts 414 and 413, and the line 415 back to —I.

As soon as the relay E is energized, it will establish an energizing circuit from plus I through the line 66, the coil 700', the contact H'a (upper), the line 65', the contact 707', and the line 64' back to —I in the manner already described in connection with Figs. 1 and 1a and relay H.

The last contact SSg will light the red, operating light 57 by the circuit extending from the positive bar 429 of the 50 volt supervisory bus. This circuit extends through the lines 431, the coil 32 of the relay F, the line 432, the contact Hc, the line 433, the contact SSg, the lines 434 and 435, the resistance 436 to ground 63. The light 57 will be lit through the line 437 which is connected to an adjustable contact on their resistance 436.

The load limiting relay CC will operate to prevent the converter A taking up excessive load or to throw out the converter on excessive load.

It will be noted that the contacts CCa establish a circuit to the relay X to increase the field enabling the converter A to take on more load. Where, however, the current passing through the lines 442, the coil 443, and the line 444 (Fig. 1) is sufficient to move the cross bar of the relay CC to open the contacts CCa, the circuit of the relay X will be open and the field cannot be strengthened by the relay BB. If the load nevertheless still increases and there is an overload, say for example 5%, the contacts CCb will close operating the relay N (see Fig. 1a) which will trip out the machine from both the A. C. and D. C. sides.

The tripping circuit extends from plus I through the line 447 (Fig. 1a), the coil N, line 96, the line 446, the line 95, the contacts CCb and the line 445 back to —I.

This circuit will energize the relay N. As stated, operation of relay N will result in closure of the contacts a to d, all inclusive, which respectively will operate the relay H, the relay SS, the machine circuit breaker 11, and the positive, negative and neutral circuit breakers 39, 40 and 20.

The circuit for the relay N will be energized in case of reverse current flow through the shunt 89 or at a certain minimum load value on the converter A, say 25% of rated load. In the latter case the circuit established will be the same up to and including the line 95 and it then will extend through the line 449, the contacts 448 and 413 and the line 415 back to —I. This will immediately trip out the machine through the relay N. Operation of the relay N will result in closure of the contact 11b (see Fig. 1a) which will energize the relay O.

The relay O through its contact Oa will light the green light, through its contact Ob will operate the field rheostat motor 200 down to full weak position, through its contact Oc will trip the main field circuit breaker 27 and through its contact Od will actuate the brush operating motor 201 (see Fig. 4).

It will be noted that the main field circuit breaker will not open until the field has been lowered to full weak position by reason of the interlocking contact 209 (Fig. 4).

It is also possible to stop the machine manually by throwing the lever 54 to close the circuit between the conductors 51, 52 and 53 on the remote control board 600. When this is done a circuit will be established from the positive bus bar 429 through the line 432, the contact Hc, the line 433, the contact SSg and the line 434, the switch 54, and the line 53 to the ground 63. This circuit will close the contact of the relay F energizing the coil N, through the circuit including the lines 447 and 96, the relay F and the line 64 back to —I.

Operation of the relay N and subsequent operation of the relay O will then put the entire system back in starting position. Where it is desired to start the machine locally instead of remotely at the control board 600, the lever 490 of the switch KK may be employed. Movement of the switch 490 to the right will energize the circuit of the relay H while movement to the left will energize the circuit of the relay N, which respectively are the main starting and stopping relays. The switch 490 in these two positions short-circuits the contacts of the relays G and H respectively.

The lower switch LL, shown in Fig. 1a, enables a shift from manual to automatic operation, and when lever 491 is thrown to the right it will cut in the relay SS enabling such relay to automatically control the operation of the converter. When, however, it is thrown to the left it will throw out the relay SS and the machine can then be controlled manually.

It is apparent that the invention has greatly simplified the control system and has reduced the relays necessary from about 40 to 45 to about 20 to 25, the exact number being determined by the various types of relays, which may be inserted in the circuits in Figs. 1 and 1a. It will be further noted that although all relays are energized or operated during the starting or tripping off sequences, nevertheless, only one D. C. relay O will be energized during idle periods and no relay during operation of the machine. Moreover, it will be noted that it is only necessary to use one A. C. relay DD.

The installation as shown may be readily applied to converter systems to replace old installations and has a relatively low installation cost as compared to old systems. For example, whereas an old system having 45 relays will take 960 man hours in installation the present system will only require about 200 man hours. Moreover, with the new system, the total cost will only be $4,350.00 as compared to an installation cost of $8,700.00 with the old system and a power expenditure for operation, a clear saving, both in initial cost and in power consumption.

Moreover, the installation as indicated in Figs. 1 and 1a, enables considerable economy in space consumption and construction of the main relay control board, such board, for example, only having an area of 10' x 3' as compared to the old control board of 10' x 6'. Moreover, the system as shown in the present application has a minimum of wiring and circuit complication, gives full protection, may be readily actuated remotely or local, and when it is remotely controlled, only three connecting wires are necessary. In addition, it is relatively simple to shift from remote automatic operation to local manual control. In starting automatically, in either the remote or local position, the machine follows the same sequences and there is at all times full protection against (1) Starting on a dead high tension feeder or where there is a dip in the voltage of such feeder.

(2) Wrong polarity or sudden reversal of polarity after the machine is up to speed or is in synchronism, both before and after the delta breaker is closed, and when the D. C. circuit breakers are about to close, prior to carrying a load.

(3) Starting with any of the breakers closed, or with the field rheostat not in full weak position, or with the brushes down.

(4) Starting when the machine is not at a higher voltage than the line.

Moreover, during operation the machine may be shut down at any predetermined minimum load, while another machine may always be started at any predetermined high-load or over-load value.

Furthermore, the field of the converter is automatically increased or decreased during the operation through the relays BB, X, XX, and T to increase or decrease the field strength and equalize the voltages between the machine lines 45 and 46 and the bus lines 37 and 41. Over-loading to increase the field is prevented by operation of the over-load relay CC which, at excessive overload, not only will prevent increase of field strength but will also throw out the machine at both the A. C. and D. C. sides by operation of the relay N.

Furthermore, in case of a dead field or a drop in the voltage in the main feeder 10, or in case of other difficulties which might result in reverse current through the shunt 89, the relay U will be operated to operate the relay N, which will throw out the machine both at D. C. and A. C. sides.

The particular advantage of the present invention resides in the fact that the conventional wiring of the converter, if in service and under manual control, may be utilized without need for additional wiring or circuits and the present system may be very conveniently employed in connection with a manual A. C. starting system without great expense. And a very substantial advantage of the present system resides in the fact that there will be a minimum power consumption during the periods when the machine is operating or is idle, since only the relays BB, U and O will be energized during such periods.

Each machine and control system may be operated as a single unit and be placed on the circuit whenever desired. The whole arrangement can be conveniently mounted above the control board of any machine manually controlled and the system may be extensively used in installations where there is a demand solely for automatic control by connecting the designated parts in parallel with the manual control devices. Furthermore, at the remote control board the operator may tell at a glance by the indicators 55 to 57 when the machine is starting, when it is on the line carrying load and when it is shutting down.

The present system is particularly advantageous as compared to a manual starting system since in such a manual system the operator has to be highly skilled and has to use great caution in following the predetermined sequence, or otherwise there will be damage to the very expensive machinery.

In the manual sequence, it is necessary for the operator first to close the Y switch then to close the machine oil circuit breaker, or H switch as it is sometimes termed. Then as the speed of the machine increases and approaches synchronism the operator has to energize the field. The operator then observes readings on the voltmeter which is connected across the pilot brushes on the D. C. side and it is necessary for him to estimate whether the machine is of correct polarity and up to synchronous speed by the readings of the voltmeter. If the polarity is wrong, it is necessary for the operator to increase the field strength until machine corrects itself. When the polarity is corrected the operator then closes the delta switch, thus tying the machine on the line.

In manual control of this character, there is no assurance that the machine may not swing back to incorrect polarity before it is placed upon the line or before or after the delta is closed, nor is there any protection against a dead feeder or a dip in the voltage of the feeder. Furthermore, the entire sequence must be controlled with great caution by the operator and slight deviations on the part of the operator will result in serious damage and injury to the machinery.

The present system is also much superior to systems in which there is a fixed point on the field rheostat for correcting polarity after the Y switch has been closed. It is difficult to determine this fixed point upon the rheostat and considerable delay is often involved in this method of starting.

The present system is also superior to those systems which employ motor driven drums which contain a number of contacts so arranged that after the first one makes up there will be a definite time lapse before the next one makes up and so forth. In this type of device, it is necessary to have a shaft of driving motor geared to the drum and adjust the speed of the motor by means of a shunt.

A difficulty of this system is that the last relay must be closed before the drum completes its operating travel, otherwise the machine will be thrown out and the sequence will have to be restarted.

Furthermore, in this type of system all the relays are alive during the load carrying period and the system consumes an excessive amount of power. This system with remote control requires a very large number of wires and usually there is provided a distributor with about 75 contacts, each contact being travelled over by rotating finger which must be driven by a motor at a certain speed to transmit impulses to a receiving distributor, which is synchronized.

Still another system which is not as satisfactory as that of the present application is that which involves starting with polarized relays which remain in position when they are operating and which operate a second relay, when they start off the sequence of the machine. In this system the field circuit is closed by a relay connected to the pilot brushes and is necessary to use a fixed polarity point on the field rheostat.

As soon as the field circuit is energized it cuts out a certain amount of resistance which must be predetermined by tests.

Moreover should the A. C. main feeder voltage fall off on this system, when the delta is closed or is closing, there is a possibility of a reversed polarity at the D. C. end of the machine, which would likely cause damage to the relays used for closing line breakers.

In general, none of these systems give full protection against overload, against too low output of power, against reversal of current toward the machine on the starting period, against loss of feeder or excessive voltage dip in the high tension supply feeder, against polarity reversal after the delta switch is closed and against hunting of the machine during operation.

Moreover, the system of the present application may be readily utilized for motor generator sets with the elimination of the relays Q, Z and the rectifier devices JJ.

The red, white and green lights 55, 56 and 57 on the remote control board 600 conveniently indicate the status of the system and double lighting indicates trouble. The lighting of the white and the green lights, for example, indicates a dead high tension feeder, while simultaneous lighting of a white and red light indicates relay trouble.

The characteristics of the present machine are particularly apparent when the operation of it is considered. For example, the machine will be automatically tripped out at a predetermined value above full load, at 25% or zero load, upon reverse current and moreover it is possible to prevent the machine from taking up more load by preventing increase of its field through the relay CC.

The switches FF, KK and LL are simple in construction and operation and they are much less expensive and simpler to operate than the complicated drum switches which are usually necessary for manual or automatic control.

The invention, however, is not intended to be restricted to any particular construction or arrangement of parts, or to any particular application of any such construction, or to any specific method of operation, or manner of use, or to any of various details thereof, herein shown and described, as the same may be modified in various particulars or be applied in many varied relations without departing from the spirit and scope of the invention claimed, the practical embodiments herein illustrated and described merely showing some of the various features entering into the application of the invention.

What is claimed is:

1. An automatic control installation for starting, operating and stopping a synchronous converter system of the type having a main high tension multi-phase main feeder, a machine circuit breaker connected to said feeder, a Y circuit breaker and a delta circuit breaker alternately connected to said machine circuit breaker, said Y breaker being connected during starting and said delta breaker during operating, a transformer connected alternately to said delta and Y breaker, to said Y breaker during starting and to said delta breaker during operating to produce a multi-phase subsidiary feeder, a synchronous converter rotor connected to said subsidiary feeder, a stator carrying a field winding, a circuit leading to said field winding including a field circuit breaker and an adjustable field rheostat, a motor to adjust said rheostat, said rotor carrying a commutator, pilot and main brushes to cooperate with said commutator, a motor to elevate and lower said main brushes, direct current lines connected to said main brushes, and independently operated negative and positive breakers on said direct current lines; said installation comprising a plurality of control circuits having means for closing the Y breaker, means for closing the machine breaker, means for closing the field breaker, means for actuating said adjusting motor to decrease the resistance at the field rheostat, means for opening the Y breaker and means for closing the delta breaker substantially immediately thereafter, means for operating the motor for lowering the brushes, means for closing the negative breaker and means for closing the positive breaker, each of said means including a control relay and means for operating each of said means automatically in the sequence stated, an additional control operating relay and means to energize said additional relay and to deenergize said other control relays subsequent to closing of said positive breaker.

2. An automatic control installation for starting, operating and stopping a synchronous converter system of the type having a main high tension multi-phase main feeder, a machine circuit breaker connected to said feeder, a Y circuit breaker and a delta circuit breaker alternately connected to said machine circuit breaker, said Y breaker being connected during starting and said delta breaker during operating, a transformer connected alternately to said delta and Y breaker, to said Y breaker during starting and to said delta breaker during operating to produce a multi-phase subsidiary feeder, a synchronous converter rotor connected to said subsidiary feeder, a stator carrying a field winding, a circuit leading to said field winding including a field circuit breaker and an adjustable field rheostat, a motor to adjust said rheostat, said rotor carrying a commutator, pilot and main brushes to cooperate with said commutator, a motor to elevate and lower said main brushes, direct current lines connected to said main brushes, and independently operated negative and positive breakers on said direct current lines; said installation comprising a plurality of control circuits having means for closing the Y breaker, means for closing the machine breaker, means for closing the field breaker, means for actuating said adjusting motor to decrease the resistance at the field rheostat, means for opening the Y breaker and means for closing the delta breaker substantially immediately thereafter, means for operating the motor for lowering the brushes, means for closing the negative breaker and means for closing the positive breaker, each of said means including a control relay and means for operating each of said means automatically in the sequence stated, and means are provided to delay operation of the means for closing the delta breaker upon reverse polarity at the pilot brushes before closing of the delta breaker.

3. An automatic control installation for starting, operating and stopping a synchronous converter system of the type having a main high tension multi-phase main feeder, a machine circuit breaker connected to said feeder, a Y circuit breaker and a delta circuit breaker alternately connected to said machine circuit breaker, said Y breaker being connected during starting and said delta breaker during operating, a transformer connected alternately to said delta and Y breaker, to said Y breaker during starting and to said delta breaker during operating to produce a multi-phase subsidiary feeder, a synchronous converter rotor connected to said subsidiary feeder, a stator carrying a field winding, a circuit leading to said field winding including a field circuit breaker and an adjustable field rheostat, a motor to adjust said rheostat, said rotor carrying a commutator, pilot and main brushes to cooperate with said commutator, a motor to elevate and lower said main brushes, direct current lines connected to said main brushes, and independently operated negative and positive breakers on said direct current lines; said installation comprising a plurality of control circuits having means for closing the Y breaker, means for closing the machine breaker, means for closing the field breaker, means for actuating said adjusting motor to decrease the resistance at the field rheostat, means for opening the Y breaker and means for closing the delta breaker substantially immediately thereafter, means for operating the motor for lowering the brushes, means for closing the negative breaker and means for closing the positive breaker, each of said means including a control relay and means for operating each of said means automatically in the sequence stated, and means to delay operation of the means for closing the positive breaker upon reverse polarity at the pilot brushes after closing of the delta breaker.

4. An automatic control installation for starting, operating and stopping a synchronous converter system of the type having a main high tension multi-phase main feeder, a machine circuit breaker connected to said feeder, a Y circuit breaker and a delta circuit breaker alternately connected to said machine circuit breaker, said Y breaker being connected during starting and said delta breaker during operating, a transformer connected alternately to said delta and Y breaker, to said Y breaker during starting and to said delta breaker during operating to produce a multi-phase subsidiary feeder, a synchronous converter rotor connected to said subsidiary feeder, a stator carrying a field winding, a circuit leading to said field winding including a field circuit breaker and an adjustable field rheostat, a motor to adjust said rheostat, said rotor carrying a commutator, pilot and main brushes to cooperate with said commutator, a motor to elevate and lower said main brushes, direct current lines connected to said main brushes, and independently operated negative and positive breakers on said direct current lines; said installation comprising a plurality of control circuits having means for closing the Y breaker, means for closing the machine breaker, means for closing the field breaker, means for actuating said adjusting motor to decrease the resistance at the field rheostat, means for opening the Y breaker and means for closing the delta breaker substantially immediately thereafter, means for operating the motor for lowering the brushes, means for closing the negative breaker and means for closing the positive breaker, each of said means including a control relay and means for operating each of said means automatically in the sequence stated, and an additional control means energized during operation for automatically starting another converter when said converter is fully loaded.

5. An automatic control installation for starting, operating and stopping a synchronous converter system of the type having a main high tension multi-phase main feeder, a machine circuit breaker connected to said feeder, a Y circuit breaker and a delta circuit breaker alternately connected to said machine circuit breaker, said Y breaker being connected during starting and said delta breaker during operating, a transformer connected alternately to said delta and Y breaker, to said Y breaker during starting and to said delta breaker during operating to produce a multi-phase subsidiary feeder, a synchronous converter rotor connected to said subsidiary feeder, a stator carrying a field winding, a circuit leading to said field winding including a field circuit breaker and an adjustable field rheostat, a motor to adjust said rheostat, said rotor carrying a commutator, a pilot and main brushes to cooperate with said commutator, a motor to elevate and lower said main brushes, direct current lines connected to said main brushes, and independently operated negative and positive breakers on said direct current lines; said installation comprising a plurality of control circuits having means for closing the Y breaker, means for closing the machine breaker, means for closing the field breaker, means for actuating said adjusting motor to decrease the resistance at the field rheostat, means for opening the Y breaker and means for closing the delta breaker substantially immediately thereafter, means for operating the motor for lowering the brushes, means for closing the negative breaker and means for closing the positive breaker, each of said means including a control relay and means for operating each of said means automatically in the sequence stated, and an additional control means energized during operation for automatically stopping said converter when said converter is underloaded.

6. An automatic control installation for starting, operating and stopping a synchronous converter system of the type having a main high tension multi-phase main feeder, a machine circuit breaker connected to said feeder, a Y circuit breaker and a delta circuit breaker alternately connected to said machine circuit breaker, said Y breaker being connected during starting and said delta breaker during operating, a transformer connected alternately to said delta and Y breaker, to said Y breaker during starting and to said delta breaker during operating to produce a multi-phase subsidiary feeder, a synchronous converter rotor connected to said subsidiary feeder, a stator carrying a field winding, a circuit leading to said field winding including a field circuit breaker and an adjustable field rheostat, a motor to adjust said rheostat, said rotor carrying a commutator, pilot and main brushes to cooperate with said commutator, a motor to elevate and lower said main brushes, direct current lines connected to said main brushes, and independently operated negative and positive breakers on said direct current lines; said installation comprising a plurality of control circuits having means for closing the Y breaker, means for closing the machine breaker, means for closing the field breaker, means for actuating said adjusting motor to decrease the resistance at the field rheostat, means for opening the Y breaker and means for closing the delta breaker substantially immediately thereafter, means for operating the motor for lowering the brushes, means for closing the negative breaker and means for closing the positive breaker, each of said means including a control relay and means for operating each of said means automatically in the sequence stated, and an additional control means energized during operation for automatically stopping said converter upon sudden fluctuations in the load.

7. An automatic control installation for starting, operating and stopping a synchronous converter system of the type having a main high tension multi-phase main feeder, a machine circuit breaker connected to said feeder, a Y circuit breaker and a delta circuit breaker alternately connected to said machine circuit breaker, said Y breaker being connected during starting and said delta breaker during operating, a transformer connected alternately to said delta and Y breaker, to said Y breaker during starting and to said delta breaker during operating to produce a multi-phase subsidiary feeder, a synchronous converter rotor connected to said subsidiary feeder, a stator carrying a field winding, a circuit leading to said field winding including a field circuit breaker and an adjustable field rheostat, a motor to adjust said rheostat, said rotor carrying a commutator, pilot and main brushes to cooperate with said commutator, a motor to elevate and lower said main brushes, direct current lines connected to said main brushes, and independently operated negative and positive breakers on said direct current lines; said installation comprising a plurality of control circuits having means for closing the Y breaker, means for closing the machine breaker, means for closing the field breaker, means for actuating said adjusting motor to decrease the resistance at the field rheostat, means for opening the Y breaker and means for closing the delta breaker substantially immediately thereafter, means for operating the motor for lowering the brushes, means for closing the negative breaker and means for closing the positive breaker, each of said means including a control relay and means for operating each of said means automatically in the sequence stated, and an additional control means energized during operation for automatically stopping said converter when there is reverse current past the negative and positive breakers.

8. An automatic control installation for starting, operating and stopping a synchronous converter system of the type having a main high tension multi-phase main feeder, a machine circuit breaker connected to said feeder, a Y circuit breaker and a delta circuit breaker alternately connected to said machine circuit breaker, said Y breaker being connected during starting and said delta breaker during operating, a transformer connected alternately to said delta and Y breaker, to said Y breaker during starting and to said delta breaker during operating to produce a multi-phase subsidiary feeder, a synchronous converter rotor connected to said subsidiary feeder, a stator carrying a field winding, a circuit leading to said field winding including a field circuit breaker and an adjustable field rheostat, a motor to adjust said rheostat, said rotor carrying a commutator, pilot and main brushes to cooperate with said commutator, a motor to elevate and lower said main brushes, direct current lines connected to said main brushes, and independently operated negative and positive breakers on said direct current lines; said installation comprising a plurality of control circuits having means for closing the Y breaker, means for closing the machine breaker, means for closing the field breaker, means for actuating said adjusting motor to decrease the resistance at the field rheostat, means for opening the Y breaker and means for closing the delta breaker substantially immediately thereafter, means for operating the motor for lowering the brushes, means for closing the negative breaker and means for closing the positive breaker, each of said means including a control relay and means for operating each of said means automatically in the sequence stated, and an additional control means energized during operation for automatically stopping said converter when there is a failure in the main feeder.

9. An automatic control installation for starting, operating and stopping a synchronous converter system of the type having a main high tension multi-phase main feeder, a machine circuit breaker connected to said feeder, a Y circuit breaker and a delta circuit breaker alternately connected to said machine circuit breaker, said Y breaker being connected during starting and said delta breaker during operating, a transformer connected alternately to said delta and Y breaker, to said Y breaker during starting and to said delta breaker during operating to produce a multi-phase subsidiary feeder, a synchronous converter rotor connected to said subsidiary feeder, a stator carrying a field winding, a circuit leading to said field winding including a field circuit breaker and an adjustable field rheostat, a motor to adjust said rheostat, said rotor carrying a commutator, pilot and main brushes to cooperate with said commutator, a motor to elevate and lower said main brushes, direct current lines connected to said main brushes, and independently operated negative and positive breakers on said direct current lines; said installation comprising a plurality of control circuits having means for closing the Y breaker, means for closing the machine breaker, means for closing the field breaker, means for actuating said adjusting motor to decrease the resistance at the field rheostat, means for opening the Y breaker and means for closing the delta breaker substantially immediately thereafter, means for operating the motor for lowering the brushes, means for closing the negative breaker and means for closing the positive breaker, each of said means including a control relay and means for operating each of said means automatically in the sequence stated, and an additional control means energized upon stopping for automatically actuating said brush motor to elevate the main brushes upon stopping of the converter.

10. An automatic control installation for starting, operating and stopping a synchronous converter system of the type having a main high tension multi-phase main feeder, a machine circuit breaker connected to said feeder, a Y circuit breaker and a delta circuit breaker alternately connected to said machine circuit breaker, said Y breaker being connected during starting and said delta breaker during operating, a transformer connected alternately to said delta and Y breaker, to said Y breaker during starting and to said delta breaker during operating to produce a multi-phase subsidiary feeder, a synchronous converter rotor connected to said subsidiary feeder, a stator carrying a field winding, a circuit leading to said field winding including a field circuit breaker and an adjustable field rheostat, a motor to adjust said rheostat, said rotor carrying a commutator, pilot and main brushes to cooperate with said commutator, a motor to elevate and lower said main brushes, direct current lines connected to said main brushes, and independently operated negative and positive breakers on said direct current lines; said installation comprising a plurality of control circuits having means for closing the Y breaker, means for closing the machine breaker, means for closing the field breaker, means for actuating said adjusting motor to decrease the resistance at the field rheostat, means for opening the Y breaker and means for closing the delta breaker substantially immediately thereafter, means for operating the motor for lowering the brushes, means for closing the negative breaker and means for closing the positive breaker, each of said means including a control relay and means for operating each of said means automatically in the sequence stated, and an additional control energized upon stopping for automatically actuating the adjusting motor to cut in the full resistance at the rheostat upon stopping of the converter and to prevent said converter from being started until said rheostat is in full weak position.

11. An automatic control installation for starting, operating and stopping a synchronous converter system of the type having a main high tension multi-phase main feeder, a machine circuit breaker connected to said feeder, a Y circuit breaker and a delta circuit breaker alternately connected to said machine circuit breaker, said Y breaker being connected during starting and said delta breaker during operating, a transformer connected alternately to said delta and Y breaker, to said Y breaker during starting and to said delta breaker during operating to produce a multi-phase subsidiary feeder, a synchronous converter rotor connected to said subsidiary feeder, a stator carrying a field winding, a circuit leading to said field winding including a field circuit breaker and an adjustable field rheostat, a motor to adjust said rheostat, said rotor carrying a commutator, pilot and main brushes to cooperate with said commutator, a motor to elevate and lower said main brushes, direct current lines connected to said main brushes, and independently operated negative and positive breakers on said direct current lines; said installation comprising a plurality of control circuits having means for closing the Y breaker, means for closing the machine breaker, means for closing the field breaker, means for actuating said adjusting motor to decrease the resistance at the field rheostat, means for opening the Y breaker and means for closing the delta breaker substantially immediately thereafter, means for operating the motor for lowering the brushes, means for closing the negative breaker and means for closing the positive breaker, each of said means including a control relay and means for operating each of said means automatically in the sequence stated, and an additional control means energized upon stopping for automatically actuating the adjusting motor to cut in the full resistance at the rheostat upon stopping of the converter before opening the field circuit breakers.

12. An automatic control installation for starting, operating and stopping a synchronous converter system of the type having a main high tension multi-phase main feeder, a machine circuit breaker connected to said feeder, a Y circuit breaker and a delta circuit breaker alternately connected to said machine circuit breaker, said Y breaker being connected during starting and said delta breaker during operating, a transformer connected alternately to said delta and Y breaker, to said Y breaker during starting and to said delta breaker during operating to produce a multi-phase subsidiary feeder, a synchronous converter rotor connected to said subsidiary feeder, a stator carrying a field winding, a circuit leading to said field winding including a field circuit breaker and an adjustable field rheostat, a motor to adjust said rheostat, said rotor carrying a commutator, pilot and main brushes to cooperate with said commutator, a motor to elevate and lower said main brushes, direct current lines connected to said main brushes, and independently operated negative and positive breakers on said direct current lines; said installation comprising a plurality of control circuits having means for closing the Y breaker, means for closing the machine breaker, means for closing the field breaker, means for actuating said adjusting motor to decrease the resistance at the field rheostat, means for opening the Y breaker and means for closing the delta breaker substantially immediately thereafter, means for operating the motor for lowering the brushes, means for closing the negative breaker and means for closing the positive breaker, each of said means including a control relay and means for operating each of said means automatically in the sequence stated, an additional control energized during the time the converter is not in operation and means to deenergize all said other control relays when the converter is not in operation.

13. An automatic control installation for starting, operating and stopping a synchronous converter system of the type having a main high tension multi-phase main feeder, a machine circuit breaker connected to said feeder, a Y circuit breaker and a delta circuit breaker alternately connected to said machine circuit breaker, said Y breaker being connected during starting and said delta breaker during operating, a transformer connected alternately to said delta and Y breaker, to said Y breaker during starting and to said delta breaker during operating to produce a multi-phase subsidiary feeder, a synchronous converter rotor connected to said subsidiary feeder, a stator carrying a field winding, a circuit leading to said field winding including a field circuit breaker and an adjustable field rheostat, a motor to adjust said rheostat, said rotor carrying a commutator, pilot and main brushes to cooperate with said commutator, a motor to elevate and lower said main brushes, direct current lines connected to said main brushes, and independently operated negative and positive breakers on said direct current lines; said installation comprising a plurality of control circuits having means for closing the Y breaker, means for closing the machine breaker, means for closing the field breaker, means for actuating said adjusting motor to decrease the resistance at the field rheostat, means for opening the Y breaker and means for closing the delta breaker substantially immediately thereafter, means for operating the motor for lowering the brushes, means for closing the negative breaker and means for closing the positive breaker, each of said means including a control relay and means for operating each of said means automatically in the sequence stated, and means to delay operation of the means for closing the delta breaker upon reverse polarity and to cause opening of the delta breaker after closing thereof upon reverse polarity at the pilot brushes including copper oxide rectifiers connected in parallel and in reverse directions across said pilot brushes and two relays in circuit therewith, one of which is actuated upon correct polarity and the other of which is actuated upon reverse polarity, said relays causing actuation of said adjusting motor to change the resistance at the rheostat.

14. An automatic control installation for starting, operating and stopping a synchronous converter system of the type having a main high tension multi-phase main feeder, a machine circuit breaker connected to said feeder, a Y circuit breaker and a delta circuit breaker alternately connected to said machine circuit breaker, said Y breaker being connected during starting and said delta breaker during operating, a transformer connected alternately to said delta and Y breaker, to said Y breaker during starting and to said delta breaker during operating to produce a multi-phase subsidiary feeder, a synchronous converter rotor connected to said subsidiary feeder, a stator carrying a field winding, a circuit leading to said field winding including a field circuit breaker and an adjustable field rheostat, a motor to adjust said rheostat, said rotor carrying a commutator, pilot and main brushes to cooperate with said commutator, a motor to elevate and lower said main brushes, direct current lines connected to said main brushes, and independently operated negative and positive breakers on said direct current lines; said installation comprising a plurality of control circuits having means for closing the Y breaker, means for closing the machine breaker, means for closing the field breaker, means for actuating said adjusting motor to decrease the resistance at the field rheostat, means for opening the Y breaker and means for closing the delta breaker substantially immediately thereafter, means for operating the motor for lowering the brushes, means for closing the negative breaker and means for closing the positive breaker, each of said means including a control relay and means for operating each of said means automatically in the sequence stated, and means to delay operation of the means for closing the delta breaker upon reverse polarity and to cause opening of the delta breaker after closing thereof upon reverse polarity at the pilot brushes before and after closing of the delta breaker, said means including circuits including control relays across the pilot brushes and across the negative and positive circuit breakers respectively, said relays causing actuation of said motor to change the resistance at the rheostat.

15. An automatic control installation for starting, operating and stopping a synchronous converter system of the type having a main high tension multi-phase main feeder, a machine circuit breaker connected to said feeder, a Y circuit breaker and a delta circuit breaker alternately connected to said machine circuit breaker, said Y breaker being connected during starting and said delta breaker during operating, a transformer connected alternately to said delta and Y breaker, to said Y breaker during starting and to said delta breaker during operating to produce a multi-phase subsidiary feeder, a synchronous converter rotor connected to said subsidiary feeder, a stator carrying a field winding, a circuit leading to said field winding including a field circuit breaker and an adjustable field rheostat, a motor to adjust said rheostat, said rotor carrying a commutator, pilot and main brushes to cooperate with said commutator, a motor to elevate and lower said main brushes, direct current lines connected to said main brushes, and independently operated negative and positive breakers on said direct current lines; said installation comprising a plurality of control circuits having means for closing the Y breaker, means for closing the machine breaker, means for closing the field breaker, means for actuating said adjusting motor to decrease the resistance at the field rheostat, means for opening the Y breaker and means for closing the delta breaker substantially immediately thereafter, means for operating the motor for lowering the brushes, means for closing the negative breaker and means for closing the positive breaker, each of said means including a control relay and means for operating each of said means automatically in the sequence stated, and means for automatically controlling said adjusting motor in accordance with variation in the load on the converter during operation.

16. An automatic control installation for starting, operating and stopping a synchronous converter system of the type having a main high tension multi-phase main feeder, a machine circuit breaker connected to said feeder, a Y circuit breaker and a delta circuit breaker alternately connected to said machine circuit breaker, said Y breaker being connected during starting and said delta breaker during operating, a transformer connected alternately to said delta and Y breaker, to said Y breaker during starting and to said delta breaker during operating to produce a multi-phase subsidiary feeder, a synchronous converter rotor connected to said subsidiary feeder, a stator carrying a field winding, a circuit leading to said field winding including a field circuit breaker and an adjustable field rheostat, a motor to adjust said rheostat, said rotor carrying a commutator, pilot and main brushes to cooperate with said commutator, a motor to elevate and lower said main brushes, direct current lines connected to said main brushes, and independently operated negative and positive breakers on said direct current lines; said installation comprising a plurality of control circuits having means for closing the Y breaker, means for closing the machine breaker, means for closing the field breaker, means for actuating said adjusting motor to decrease the resistance at the field rheostat, means for opening the Y breaker and means for closing the delta breaker substantially immediately thereafter, means for operating the motor for lowering the brushes, means for closing the negative breaker and means for closing the positive breaker, each of said means including a control relay and means for operating each of said means automatically in the sequence stated, and means for preventing starting of said converter when any of said circuit breakers are closed.

17. An automatic control installation for starting, operating and stopping a synchronous converter system of the type having a main high tension multi-phase main feeder, a machine circuit breaker connected to said feeder, a Y circuit breaker and a delta circuit breaker alternately connected to said machine circuit breaker, said Y breaker being connected during starting and said delta breaker during operating, a transformer connected alternately to said delta and Y breaker, to said Y breaker during starting and to said delta breaker during operating to produce a multi-phase subsidiary feeder, a synchronous converter rotor connected to said subsidiary feeder, a stator carrying a field winding, a circuit leading to said field winding including a field circuit breaker and an adjustable field rheostat, a motor to adjust said rheostat, said rotor carrying a commutator, pilot and main brushes to cooperate with said commutator, a motor to elevate and lower said main brushes, direct current lines connected to said main brushes, and independently operated negative and positive breakers on said direct current lines; said installation comprising a plurality of control circuits having means for closing the Y breaker, means for closing the machine breaker, means for closing the field breaker, means for actuating said adjusting motor to decrease the resistance at the field rheostat, means for opening the Y breaker and means for closing the delta breaker substantially immediately thereafter, means for operating the motor for lowering the brushes, means for closing the negative breaker and means for closing the positive breaker, each of said means including a control relay and means for operating each of said means automatically in the sequence stated, a neutral circuit from the converter including a breaker is provided and means are provided to automatically close said neutral breaker when said positive breaker has been closed.

18. An automatic control installation for starting, operating and stopping a synchronous converter system of the type having a main high tension multi-phase main feeder, a machine circuit breaker connected to said feeder, a Y circuit breaker and a delta circuit breaker alternately connected to said machine circuit breaker, said Y breaker being connected during starting and said delta breaker during operating, a transformer connected alternately to said delta and Y breaker, to said Y breaker during starting and to said delta breaker during operating to produce a multi-phase subsidiary feeder, a synchronous converter rotor connected to said subsidiary feeder, a stator carrying a field winding, a circuit leading to said field winding including a field circuit breaker and an adjustable field rheostat, a motor to adjust said rheostat, said rotor carrying a commutator, pilot and main brushes to cooperate with said commutator, a motor to elevate and lower said main brushes, direct current lines connected to said main brushes, and independently operated negative and positive breakers on said direct current lines; said installation comprising a plurality of control circuits having means for closing the Y breaker, means for closing the machine breaker, means for closing the field breaker, means for actuating said adjusting motor to decrease the resistance at the field rheostat, means for opening the Y breaker and means for closing the delta breaker substantially immediately thereafter, means for operating the motor for lowering the brushes, means for closing the negative breaker and means for closing the positive breaker, each of said means including a control relay and means for operating each of said means automatically in the sequence stated, and a remote control board provided with only three connecting wires to said installation.

19. An automatic control installation for starting, operating and stopping a synchronous converter system of the type having a main high tension multi-phase main feeder, a machine circuit breaker connected to said feeder, a Y circuit breaker and a delta circuit breaker alternately connected to said machine circuit breaker, said Y breaker being connected during starting and said delta breaker during operating, a transformer connected alternately to said delta and Y breaker, to said Y breaker during starting and to said delta breaker during operating to produce a multi-phase subsidiary feeder, a synchronous converter rotor connected to said subsidiary feeder, a stator carrying a field winding, a circuit leading to said field winding including a field circuit breaker and an adjustable field rheostat, a motor to adjust said rheostat, said rotor carrying a commutator, pilot and main brushes to cooperate with said commutator, a motor to elevate and lower said main brushes, direct current lines connected to said main brushes, and independently operated negative and positive breakers on said direct current lines; said installation comprising a plurality of control circuits having means for closing the Y breaker, means for closing the machine breaker, means for closing the field breaker, means for actuating said adjusting motor to decrease the resistance at the field rheostat, means for opening the Y breaker and means for closing the delta breaker substantially immediately thereafter, means for operating the motor for lowering the brushes, means for closing the negative breaker and means for closing the positive breaker, each of said means including a control relay and means for operating each of said means automatically in the sequence stated, each control relay being interlocked with control relay which has been operated just previously in the sequence so that said relays may only be operated in said sequence.

20. An automatic control installation for starting, operation and stopping a synchronous converter system of the type having a main high tension multi-phase main feeder, a machine circuit breaker connected to said feeder, a Y circuit breaker and a delta circuit breaker alternately connected to said machine circuit breaker, said Y breaker being connected during starting and said delta breaker during operating, a transformer connected alternately to said delta and Y breaker, to said Y breaker during starting and to said delta breaker during operating to produce a multi-phase subsidiary feeder, a synchronous converter rotor connected to said subsidiary feeder, a stator carrying a field winding, a circuit leading to said field winding including a field circuit breaker and an adjustable field rheostat, a motor to adjust said rheostat, said rotor carrying a commutator, pilot and main brushes to cooperate with said commutator, a motor to elevate and lower said main brushes, direct current lines connected to said main brushes, and independently operated negative and positive breakers on said direct current lines; said installation comprising a plurality of control circuits having means for closing the Y breaker, means for closing the machine breaker, means for closing the field breaker, means for actuating said adjusting motor to decrease the resistance at the field rheostat, means for opening the Y breaker and means for closing the delta breaker substantially immediately thereafter, means for operating the motor for lowering the brushes, means for closing the negative breaker and means for closing the positive breaker, each of said means including a control relay and means for operating each of said means automatically in the sequence stated, each control relay being interlocked with control relay which has been operated just previously in the sequence so that said relays may only be operated in said sequence, said interlock being provided by providing switches on the energizing circuits of each the relays, said switches being closed only when the preceding relay has operated and when the preceding step in the sequence has been completed.

21. An automatic control installation for starting, operating and stopping a synchronous converter system of the type having a main high tension multi-phase main feeder, a machine circuit breaker connected to said feeder, a delta circuit breaker and a Y-circuit breaker alternately connected to said machine circuit breaker, said Y breaker being connected during starting and delta breaker being connected during operating, a transformer connected alternately to said delta and Y breaker, to said Y breaker during starting and to said delta breaker during operating, to produce a multi-phase subsidiary feeder, a synchronous converter rotor connected to said subsidiary feeder, a stator carrying a field winding, a circuit leading to said field winding including a field circuit breaker and an adjustable field rheostat, a motor to adjust said rheostat, said rotor carrying a commutator, pilot and main brushes to cooperate with said commutator, a motor to elevate and lower said main brushes, direct current lines connected to said main brushes, and independently operated negative and positive breakers on said direct current lines; said installation comprising a plurality of control circuits having an operating control relay actuated to operating position when the system is operated ating and starting has been completed, said control relay having switches, said switches closing a plurality of circuits, a relay for maintaining constant voltage on the direct current lines in one circuit, and relays for operating the adjusting motor respectively to adjust the field rheostat to increase or decrease the field strength to increase or decrease the voltage in the direct current lines in two other circuits.

22. An automatic control installation for starting, operating and stopping a synchronous converter system of the type having a main high tension multi-phase main feeder, a machine circuit breaker connected to said feeder, a delta circuit breaker and a Y-circuit breaker alternately connected to said machine circuit breaker, said Y breaker being connected during starting and delta breaker being connected during operating, a transformer connected alternately to said delta and Y breaker, to said Y breaker during starting and to said delta breaker during operating, to produce a multi-phase subsidiary feeder, a synchronous converter rotor connected to said subsidiary feeder, a stator carrying a field winding, a circuit leading to said field winding including a field circuit breaker and an adjustable field rheostat, a motor to adjust said rheostat, said rotor carrying a commutator, pilot and main brushes to cooperate with said commutator, a motor to elevate and lower said main brushes, direct current lines connected to said main brushes, and independently operated negative and positive breakers on said direct current lines; said installation comprising a plurality of control circuits having an operating control relay actuated to operating position when the system is operating and starting has been completed, said control relay having switches, said switches closing a plurality of circuits, a relay on one of said circuits for throwing in another system when the first mentioned system has reached full load.

23. An automatic control installation for starting, operating and stopping a synchronous converter system of the type having a main high tension multi-phase main feeder, a machine circuit breaker connected to said feeder, a Y circuit breaker and a delta circuit breaker alternately connected to said machine circuit breaker, said Y breaker being connected during starting and said delta breaker during operating, a transformer connected alternately to said delta and Y breaker, to said Y breaker during starting and to said delta breaker during operating to produce a multi-phase subsidiary feeder, a synchronous converter rotor connected to said subsidiary feeder, a stator carrying a field winding, a circuit leading to said field winding including a field circuit breaker and an adjustable field rheostat, a motor to adjust said rheostat, said rotor carrying a commutator, pilot and main brushes to cooperate with said commutator, a motor to elevate and lower said main brushes, direct current lines connected to said main brushes, and independently operated negative and positive breakers on said direct current lines; said installation comprising a plurality of control circuits having means for closing the Y breaker, means for closing the machine breaker, means for closing the field breaker, means for actuating said adjusting motor to decrease the resistance at the field rheostat, means for opening the Y breaker and means for closing the delta breaker substantially immediately thereafter, means for operating the motor for lowering the brushes, means for closing the negative breaker and means for closing the positive breaker, each of said means including a control relay and means for operating each of said means automatically in the sequence stated, and a remote control board comprising three signal lights, a green light for indicating the system is not operating between stopping and starting and when the system is stopping, a white light for indicating when the system is starting, and a red light for indicating when the system is operating, a switch having two positions, one position to initiate starting and a second position to initiate stopping, a single wire from the board from the first starting position and two wires from the second stopping position.

24. An automatic control installation for starting, operating and stopping a synchronous converter system of the type having a main high tension multi-phase main feeder, a machine circuit breaker connected to said feeder, a Y circuit breaker and a delta circuit breaker alternately connected to said machine circuit breaker, said Y breaker being connected during starting and said delta breaker during operating, a transformer connected alternately to said delta and Y breaker, to said Y breaker during starting and to said delta breaker during operating to produce a multi-phase subsidiary feeder, a synchronous converter rotor connected to said subsidiary feeder, a stator carrying a field winding, a circuit leading to said field winding including a field circuit breaker and an adjustable field rheostat, a motor to adjust said rheostat, said rotor carrying a commutator, pilot and main brushes to cooperate with said commutator, a motor to elevate and lower said main brushes, direct current lines connected to said main brushes, and independently operated negative and positive breakers on said direct current lines; said installation comprising a plurality of control circuits having means for closing the Y breaker, means for closing the machine breaker, means for closing the field breaker, means for actuating said adjusting motor to decrease the resistance at the field rheostat, means for opening the Y breaker and means for closing the delta breaker substantially immediately thereafter, means for operating the motor for lowering the brushes, means for closing the negative breaker and means for closing the positive breaker, each of said means including a control relay and means for operating each of said means automatically in the sequence stated, and a remote control board comprising a switch having two positions, one position to initiate starting and a second position to initiate stopping, a single wire from the board from the first starting position and two wires from the second stopping position, low energy starting and stopping relays adjacent said system, starting and operating control relays adjacent said system controlling switches on the circuits of said starting and stopping relays, said single wire extending to said starting control relay.

25. An automatic control installation for starting, operating and stopping a synchronous converter system of the type having a main high tension multi-phase main feeder, a machine circuit breaker connected to said feeder, a Y circuit breaker and a delta circuit breaker alternately connected to said machine circuit breaker, said Y breaker being connected during starting and said delta breaker during operating, a transformer connected alternately to said delta and Y breaker, to said Y breaker during starting and to said delta breaker during operating to produce a multi-phase subsidiary feeder, a synchronous converter rotor connected to said subsidiary feeder, a stator carrying a field winding, a circuit leading to said field winding including a field circuit breaker and an adjustable field rheostat, a motor to adjust said rheostat, said rotor carrying a commutator, pilot and main brushes to cooperate with said commutator, a motor to elevate and lower said main brushes, direct current lines connected to said main brushes, and independently operated negative and positive breakers on said direct current lines; said installation comprising a plurality of control circuits having means for closing the Y breaker, means for closing the machine breaker, means for closing the field breaker, means for actuating said adjusting motor to decrease the resistance at the field rheostat, means for opening the Y breaker and means for closing the delta breaker substantially immediately thereafter, means for operating the motor for lowering the brushes, means for closing the negative breaker and means for closing the positive breaker, each of said means including a control relay and means for operating each of said means automatically in the sequence stated.

JOSEPH C. FERRANTE.